US012646475B2

(12) United States Patent
Zhang

(10) Patent No.: US 12,646,475 B2
(45) Date of Patent: Jun. 2, 2026

(54) DISPLAY CONTROL METHOD, DISPLAY CONTROL APPARATUS, DISPLAY DEVICE, ELECTRONIC DEVICE, AND STORAGE MEDIUM

(71) Applicant: BOE TECHNOLOGY GROUP CO., LTD., Beijing (CN)

(72) Inventor: Shuguo Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 68 days.

(21) Appl. No.: 18/690,305

(22) PCT Filed: Aug. 22, 2023

(86) PCT No.: PCT/CN2023/114149

§ 371 (c)(1),
(2) Date: Mar. 8, 2024

(87) PCT Pub. No.: WO2025/039174

PCT Pub. Date: Feb. 27, 2025

(65) Prior Publication Data

US 2025/0232737 A1 Jul. 17, 2025

(51) Int. Cl.
*G09G 3/34* (2006.01)
*G09G 3/20* (2006.01)
*G09G 3/32* (2016.01)

(52) U.S. Cl.
CPC ......... *G09G 3/3426* (2013.01); *G09G 3/2007* (2013.01); *G09G 3/32* (2013.01);
(Continued)

(58) Field of Classification Search
None
See application file for complete search history.

(56) References Cited

U.S. PATENT DOCUMENTS 11,195,479 B2 12/2021 Xi et al.
2020/0410945 A1* 12/2020 Ji ......................... G09G 3/3426
2021/0225299 A1* 7/2021 Xi ......................... G09G 3/3426

FOREIGN PATENT DOCUMENTS

CN 109243384 A 1/2019
CN 110379379 A 10/2019
(Continued)

OTHER PUBLICATIONS

Dell Latitude 9520 Setup and Specifications (Year: 2021).*

*Primary Examiner* — Matthew Yeung
(74) *Attorney, Agent, or Firm* — HOUTTEMAN LAW LLC

(57) ABSTRACT

A display control method, including: determining first backlight feature values of respective backlight partitions of a backlight module, according to first pixel data of respective pixels in an image to be displayed; determining backlight driving values of light sources in the respective backlight partitions, according to the first backlight feature values of the respective backlight partitions; determining second backlight feature values of the respective backlight partitions, according to a backlight diffusion factor group set in advance and first backlight feature values of the respective backlight partitions, where the backlight diffusion factor group includes N×N backlight diffusion factors, and N is a positive integer; and compensating the first pixel data of the respective pixels in the image to be displayed, according to the second backlight feature values of the respective backlight partitions, to obtain compensated second pixel data for displaying.

19 Claims, 11 Drawing Sheets

(52) U.S. Cl.
CPC ............... *G09G 2320/0233* (2013.01); *G09G 2320/0276* (2013.01)

(56) References Cited

FOREIGN PATENT DOCUMENTS

| | | | |
|---|---|---|---|
| CN | 112513968 | A | 3/2021 |
| CN | 114822421 | A | 7/2022 |
| CN | 116092434 | A | 5/2023 |

* cited by examiner

| | | | | | | | | |
|---|---|---|---|---|---|---|---|---|
| P1 | P2 | P3 | P4 | P5 | P6 | P7 | P8 | P9 |
| P10 | P11 | P12 | P13 | P14 | P15 | P16 | P17 | P18 |
| P19 | P20 | P21 | P22 | P23 | P24 | P25 | P26 | P27 |
| P28 | P29 | P30 | P31 | P32 | P33 | P34 | P35 | P36 |
| P37 | P38 | P39 | P40 | P41 | P42 | P43 | P44 | P45 |
| P46 | P47 | P48 | P49 | P50 | P51 | P52 | P53 | P54 |
| P55 | P56 | P57 | P58 | P59 | P60 | P61 | P62 | P63 |
| P64 | P65 | P66 | P67 | P68 | P69 | P70 | P71 | P72 |
| P73 | P74 | P75 | P76 | P77 | P78 | P79 | P80 | P81 |

| | | | | | | | | |
|---|---|---|---|---|---|---|---|---|
| a1 | a2 | a3 | a4 | a5 | a6 | a7 | a8 | a9 |
| b1 | b2 | b3 | b4 | b5 | b6 | b7 | b8 | b9 |
| c1 | c2 | c3 | c4 | c5 | c6 | c7 | c8 | c9 |
| d1 | d2 | d3 | d4 | d5 | d6 | d7 | d7 | d9 |
| e1 | e2 | e3 | e4 | e5 | e6 | e7 | e8 | e9 |
| f1 | f2 | f3 | f4 | f5 | f6 | f7 | f8 | f9 |
| g1 | g2 | g3 | g4 | g5 | g6 | g7 | g8 | g9 |
| h1 | h2 | h3 | h4 | h5 | h6 | h7 | h8 | h9 |
| i1 | i2 | i3 | i4 | i5 | i6 | i7 | i8 | i9 |

| | | | | |
|---|---|---|---|---|
| B11 | B12 | B13 | B14 | B15 |
| B21 | B22 | B23 | B24 | B25 |
| B31 | B32 | B33 | B34 | B35 |
| B41 | B42 | B43 | B44 | B45 |
| B51 | B52 | B53 | B54 | B55 |

| | | | | |
|---|---|---|---|---|
| q1 | q2 | q3 | q4 | q5 |
| q6 | q7 | q8 | q9 | q10 |
| q11 | q12 | q13 | q14 | q15 |
| q16 | q17 | q18 | q19 | q20 |
| q21 | q22 | q23 | q24 | q25 |

DISPLAY CONTROL METHOD, DISPLAY CONTROL APPARATUS, DISPLAY DEVICE, ELECTRONIC DEVICE, AND STORAGE MEDIUM

CROSS-REFERENCE TO RELATED APPLICATION

This is a National Phase Application filed under 35 U.S.C. 371 as a national stage of PCT/CN2023/114149 filed on Aug. 22, 2023, the content of which is hereby incorporated by reference in its entirety.

TECHNICAL FIELD

The present disclosure relates to the field of display technology, and particularly relates to a display control method, a display control apparatus, a display device, an electronic device, and a storage medium.

BACKGROUND

With rapid development of mini Light-Emitting Diode (mini LED) display technology, a mini LED display product has begun to be applied to the high definition display field of super large display screen, such as vehicle-mounted display, monitoring and commanding, high-definition broadcasting, high-end cinema, medical diagnosis, advertisement display, conference exhibition, office display, virtual reality, and the like, and a better display effect has been achieved.

SUMMARY

The present disclosure aims to solve at least one technical problem in the prior art and provides a display control method, a display control apparatus, a display device, an electronic device, and a storage medium.

In a first aspect, a technical solution adopted to solve the technical problem of the present disclosure is a display control method, including:

determining first backlight feature values of respective backlight partitions of a backlight module, according to first pixel data of respective pixels in an image to be displayed;

determining backlight driving values of light sources in the respective backlight partitions, according to the first backlight feature values of the respective backlight partitions;

determining second backlight feature values of the respective backlight partitions, according to a backlight diffusion factor group set in advance and the first backlight feature values of the respective backlight partitions, where the backlight diffusion factor group includes N×N backlight diffusion factors, and N is a positive integer; and compensating the first pixel data of the respective pixels in the image to be displayed, according to the second backlight feature values of the respective backlight partitions, to obtain compensated second pixel data for displaying.

In some implementations, the determining the first backlight feature values of the respective backlight partitions of the backlight module according to the first pixel data of respective pixels in the image to be displayed, includes:

performing gray scale feature extraction on the respective pixels according to the first pixel data of the respective pixels in the image to be displayed, to obtain first gray scale values of the respective pixels;

for each backlight partition, according to the first gray scale values of respective pixels corresponding to the backlight partition, determining a maximum first gray scale value of the first gray scale values as a second gray scale value of the backlight partition, and determining a mean value of the first gray scale values of the respective pixels corresponding to the backlight partition as a third gray scale value of the backlight partition; and determining the first backlight feature value of the backlight partition according to the second gray scale value, the third gray scale value and a preset weighting coefficient, where a value of the preset weighting coefficient is in a range from 0 to 1.

In some implementations, the value of the weighting coefficient is in a range from 0.5 to 0.9.

In some implementations, the determining the backlight driving values of the light sources in the respective backlight partitions according to the first backlight feature values of the respective backlight partitions, includes:

mapping the first backlight feature values of the respective backlight partitions into corresponding unadjusted backlight driving values, based on a preset mapping mode; and for each backlight partition, under a condition that the unadjusted backlight driving value is less than a first preset threshold value, determining an adjusted backlight driving value of the light source in the backlight partition, by a nonlinear mapping algorithm with a display module parameter gamma<1; and under a condition that the unadjusted backlight driving value is greater than or equal to the first preset threshold value, determining an adjusted backlight driving value of the light source in the backlight partition, by a nonlinear mapping algorithm with the display module parameter gamma>1.

In some implementations, the determining the second backlight feature values of the respective backlight partitions according to the backlight diffusion factor group set in advance and the first backlight feature values of the respective backlight partitions, includes:

for each backlight partition, weighting the first backlight feature value of the backlight partition and the first backlight feature values of first adjacent partitions of the backlight partition with N×N backlight diffusion factors in the backlight diffusion factor group, to determine the second backlight feature value of the backlight partition, where the first adjacent partitions include backlight partitions each having a partition distance from the backlight partition less than or equal to a first preset distance threshold.

In some implementations, the first adjacent partitions further include first mirroring partition having a partition distance from the backlight partition less than or equal to the first preset distance threshold; and prior to the weighting the first backlight feature value of the backlight partition and the first backlight feature values of the first adjacent partitions of the backlight partition with the N×N backlight diffusion factors in the backlight diffusion factor group, to determine the second backlight feature value of the backlight partition, the display control method further includes:

determining, with a preset mirroring algorithm, a plurality of first virtual mirroring areas of the backlight module, according to size information of the N×N backlight diffusion factors and size information of the backlight partitions divided from the backlight module, where each of the plurality of first virtual mirroring areas includes at least N rows and N columns of first mirroring partitions; and determining a first backlight feature value of the first mirroring partition, according to the first backlight feature value of the backlight partition in mirror correspondence with the first mirroring partition.

In some implementations, the determining the first backlight feature value of the first mirroring partition according to the first backlight feature value of the backlight partition in mirror correspondence with the first mirroring partition, includes:

configuring a calling address for each of at least part of the first mirroring partitions, and reading the first backlight feature value of the first mirroring partition, according to the calling address configured for the first mirroring partition.

In some implementations, the compensating the first pixel data of respective pixels in the image to be displayed according to the second backlight feature values of the respective backlight partitions, to obtain the compensated second pixel data, includes:

determining, with a preset linear interpolation algorithm, third backlight feature values of the respective pixels in the image to be displayed, according to the second backlight feature values of the respective backlight partitions; and compensating the first pixel data of the respective pixels in the image to be displayed, according to the third backlight feature values of the respective pixels in the image to be displayed, to obtain the compensated second pixel data.

In some implementations, the compensating the first pixel data of respective pixels in the image to be displayed according to the second backlight feature values of the respective backlight partitions, to obtain the compensated second pixel data, includes:

filtering the second backlight feature values of the respective backlight partitions, to obtain fourth backlight feature values of the respective backlight partitions;

determining, with a preset linear interpolation algorithm, third backlight feature values of the respective pixels in the image to be displayed, according to the fourth backlight feature values of the respective backlight partitions; and compensating the first pixel data of respective pixels in the image to be displayed, according to the third backlight feature values of respective pixels in the image to be displayed, to obtain the compensated second pixel data.

In some implementations, the filtering the second backlight feature values of the respective backlight partitions to obtain the fourth backlight feature values of the respective backlight partitions, includes:

for each of the backlight partitions, filtering the second backlight feature value of the backlight partition and the second backlight feature values of second adjacent partitions of the backlight partition, with a filter coefficient group determined in advance, to determine the fourth backlight feature value of the backlight partition, where the second adjacent partitions include backlight partitions each having a partition distance from the backlight partition less than or equal to a second preset distance threshold.

In some implementations, the second adjacent partitions further include second mirroring partitions each having a partition distance from the backlight partition less than or equal to the second preset distance threshold, where the filter coefficient group includes n×n filter coefficients, and n is a positive integer; and prior to the filtering the second backlight feature value of the backlight partition and the second backlight feature values of the second adjacent partitions of the backlight partition with the filter coefficient group determined in advance, to determine the fourth backlight feature value of the backlight partition, the display control method further includes:

determining, with a preset mirroring algorithm, a plurality of second virtual mirroring areas of the backlight module, according to size information of the n×n filter coefficients and size information of the backlight partitions divided from the backlight module; and determining a second backlight feature value of the second mirroring partition, according to the second backlight feature value of the backlight partition in mirror correspondence with the second mirroring partition.

In some implementations, the determining the second backlight feature value of the second mirroring partition according to the second backlight feature value of the backlight partition in mirror correspondence with the second mirroring partition, includes:

configuring a calling address for each of at least part of the second mirroring partitions, and reading the second backlight feature value of the second mirroring partition, according to the calling address configured for the second mirroring partition.

In some implementations, the determining, with preset linear interpolation algorithm, the third backlight feature value of the respective pixels in the image to be displayed, according to the fourth backlight feature values of the respective backlight partitions, includes:

dividing the backlight partitions into a plurality of backlight partition groups, where each of the plurality of backlight partition groups includes 2×2 backlight partitions;

for each of the plurality of backlight partition groups, determining a central area of the backlight partition group, according to central positions of respective backlight partitions in the backlight partition group, where the number of pixels in the central area is equal to the number of pixels in the backlight partition;

determining quantized data of linear interpolation of respective pixels, according to size information of the central area; and for each backlight partition group, determining, with a preset linear interpolation algorithm, the third backlight feature values of respective pixels in the central area, according to the fourth backlight feature values of the respective backlight partitions in the backlight partition group and the quantized data of the pixels in the central area, where the central areas of the respective backlight partition groups form the backlight partitions of the backlight module.

In some implementations, the compensating the first pixel data of the respective pixels in the image to be displayed, according to the third backlight feature values of the respective pixels in the image to be displayed, to obtain the compensated second pixel data, includes:

for each pixel in the image to be displayed, determining a first compensation factor of the pixel, according to the third backlight feature value of the pixel;

determining a second compensation factor of the pixel, according to the first compensation factor and the first gray scale value of the pixel; and compensating the first pixel data of the pixel with the second compensation factor, to obtain the second pixel data of the pixel.

In a second aspect, an embodiment of the present disclosure further provides a display control apparatus, including a first processing module, a second processing module, a third processing module, and a fourth processing module;

where the first processing module is configured to determine first backlight feature values of respective backlight partitions of a backlight module, according to first pixel data of respective pixels in an image to be displayed;

the second processing module is configured to determine backlight driving values of light sources in the respective backlight partitions, according to the first backlight feature values of the respective backlight partitions;

the third processing module is configured to determine second backlight feature values of the respective backlight partitions, according to a backlight diffusion factor group set in advance and the first backlight feature values of the respective backlight partitions, where the backlight diffusion factor group includes N×N backlight diffusion factors, and N is a positive integer; and the fourth processing module is configured to compensate the first pixel data of the respective pixels in the image to be displayed, according to the second backlight feature values of the respective backlight partitions, to obtain compensated second pixel data for displaying.

In a third aspect, an embodiment of the present disclosure further provides a display device, including a backlight module, a display module, and a display control apparatus, where the display control apparatus is connected to both of the backlight module and the display module, and the display control apparatus is the display control apparatus in the second aspect;

the backlight module includes a driving component and a plurality of backlight partitions, where the driving component serves to drive the plurality of backlight partitions to emit backlight, according to backlight driving values of the plurality of backlight partitions; and the display module serves to display according to input second pixel data.

In some implementations, the display module includes a 14.96-inch display screen.

In a fourth aspect, an embodiment of the present disclosure further provides an electronic device, including:

one or more processors; and a memory for storing one or more programs, where when being executed by the one or more processors, the one or more programs cause the one or more processors to implement any one display control method in the first aspect.

In some implementations, the processor includes a Field Programmable Gate Array (FPGA).

In a fifth aspect, an embodiment of the present disclosure further provides a non-transitory computer readable storage medium storing thereon a computer program which, when being executed by a processor, performs steps of any one display control method in the first aspect.

DETAIL DESCRIPTION OF EMBODIMENTS

Figure 1:
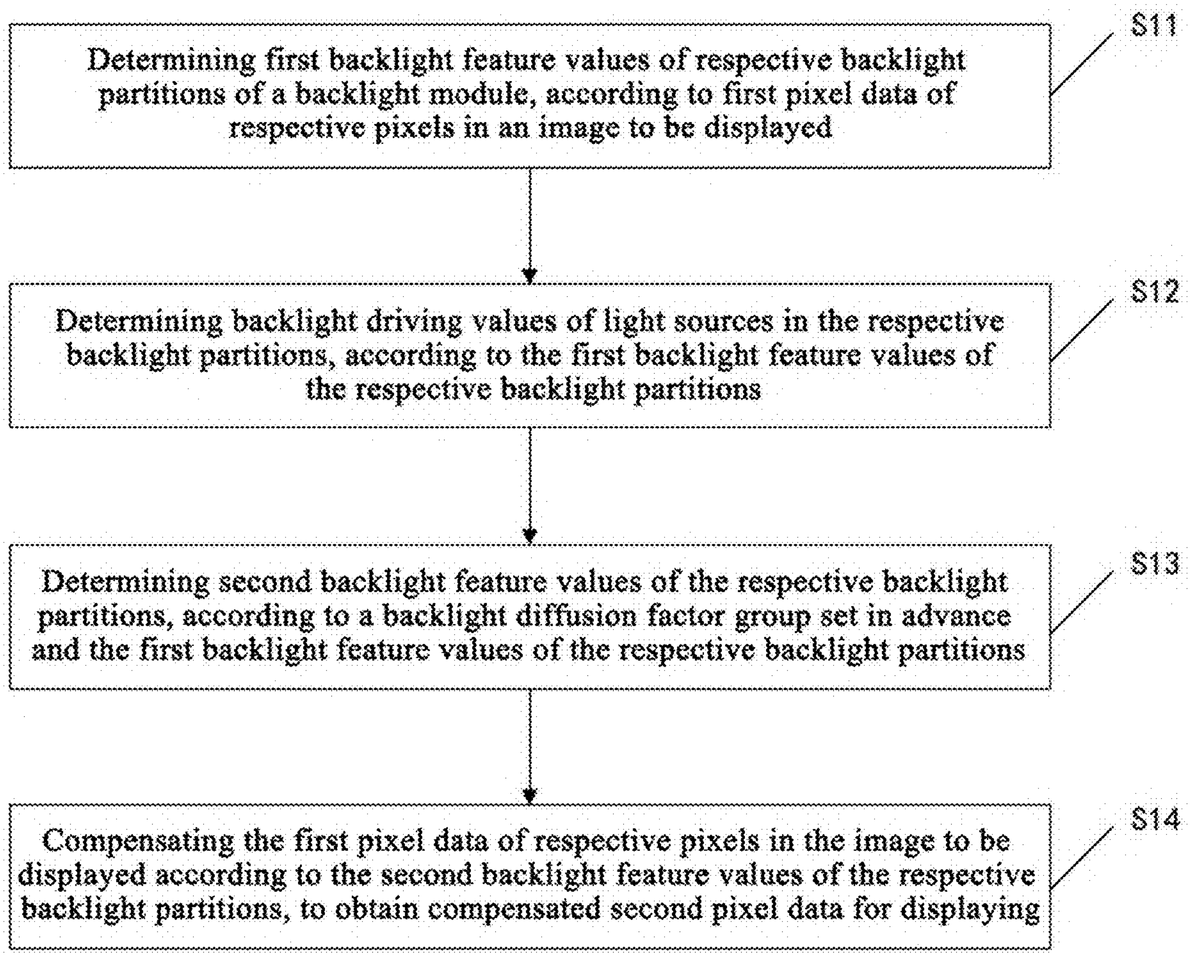
FIG. 1 is a flowchart illustrating a display control method according to an embodiment of the present disclosure.

In order to make the objects, technical solutions and advantages of the embodiments of the present disclosure more apparent, the technical solutions of the embodiments of the present disclosure will be clearly and completely described below with reference to the drawings of the embodiments of the present disclosure. Obviously, the described embodiments are some, but not all, embodiments of the present disclosure. The components of the embodiments of the present disclosure, described and illustrated in the drawings herein, generally could be arranged and designed in a wide variety of different configurations. Thus, the following detailed description of the embodiments of the present disclosure, provided in the accompanying drawings, is not intended to limit the protection scope of the present disclosure, but merely represents selected embodiments of the present disclosure. All other embodiments, which can be derived by one of ordinary skill in the art from the described embodiments of the present disclosure without creative efforts, are within the protection scope of the present disclosure.

Unless defined otherwise, technical or scientific terms used herein shall have the ordinary meaning as understood by one of ordinary skill in the art to which the present disclosure belongs. The use of "first", "second", and the like in the present disclosure is not intended to indicate any order, quantity, or importance, but rather serves to distinguish one element from another. Also, the term "a", "an", "the" or the like does not denote a limitation of quantity, but rather denotes the presence of at least one. The word "comprising/including", "comprises/includes", or the like means that the element or item preceding the word includes the element or item listed after the word and its equivalent, but does not exclude other elements or items. The term "connected", "coupled" or the like is not restricted to physical or mechanical connections, but may include electrical connections, whether direct or indirect. The terms "upper", "lower", "left", "right", and the like are used only to indicate relative positional relationships, and when the absolute position of the object being described is changed, the relative positional relationships may also be changed accordingly.

Reference to "a plurality of" or "a number of" in the present disclosure means two or more. "And/or" describes an association relationship between associated objects, and indicates that three relationships may exist. For example, A and/or B may indicate: A exists alone, A and B exist simultaneously, or B exists alone. The character "/" generally indicates that the associated objects before and after the character "/" are in an "or" relationship.

In recent years, with the rapid rise of new energy automobiles, trends of "electrification", "intelligence" and "large screen display" are more obvious, and vehicle-mounted display becomes an important factor for measuring vehicle experience. Adopting mini LED display technology to realize vehicle-mounted display can realize better display effect, and promote a user's experience with the vehicle.

In the related art, for the conventional image display, image information input by the system is used to extract a brightness feature on one hand, so as to determine a backlight driving value to drive a backlight panel; and on the other hand, the input image information is used for simulating pixel compensation, so as to improve the display effect. However, the conventional display algorithm has certain defects, on one hand, the implementation process of the algorithm needs a large amount of storage resources and is not favorable for being deployed on a low-end chip, so that the hardware cost for supporting the conventional algorithm is high; on the other hand, the backlight module is divided into a plurality of backlight partitions, partition control of the light source causes a fact that the backlight brightness is not unified any more, and the backlight driving values between adjacent backlight partitions still have a relatively large difference therebetween, so that smooth transition effect of the pixel compensation between the adjacent partitions is poor, and block effect of the image cannot be eliminated.

It should be noted that the backlight driving value in the present disclosure is driving data used by the LED driving module to drive the backlight module.

In order to overcome the defects in the related art, the backlight brightness of the LED display system may be dynamically adjusted with a local dynamic backlight control method. The local dynamic backlight control is realized based on the pixel display principle of a liquid crystal display. The liquid crystal display displays pixels by controlling the deflection of liquid crystal molecules with an electro-optic effect of liquid crystal, to vary an output luminous flux of each pixel. When displaying the same image with backlights of different brightness, it is theoretically possible to ensure that the displayed image is constant as long as the output luminous flux of each pixel remains constant, and this principle is summarized into a formula as follows:

$$BL \times \frac{g}{1023} \times \left(\frac{g}{1023}\right)^{\gamma} = \overline{BL} \times \left(\frac{\bar{g}}{1023}\right)^{\gamma}. \qquad \text{formula (1)}$$

In formula (1), BL is a backlight brightness value of the pixel before light adjusting, g is a pixel gray scale value of the pixel before light adjusting (i.e., a maximum gray scale value of R, G, B sub-pixels in the pixel), $\overline{BL}$ is a backlight brightness value of the pixel after light adjusting, g is a pixel gray scale value of the pixel after light adjusting, and y is a constant power exponent determined based on the display device itself. From formula (1), it can be seen that if the backlight brightness value BL decreases, the final brightness of the display image (i.e., output luminous flux) will also change. In order to reduce the backlight while ensuring the brightness of the emitted light remains unchanged, it is necessary to appropriately increase the value of g, to increase a transmittance of the emitted light.

In a first aspect, an embodiment of the present disclosure provides a display control method, and FIG. 1 is a flowchart illustrating the display control method according to the embodiment of the present disclosure. The display control method may be applied to a display control apparatus, which may be implemented by software and/or hardware, where generally, the software may be integrated in an electronic device, and the hardware may be deployed in a display device. As shown in FIG. 1, the display control method includes the following steps S11 to S14.

At step S11, determining first backlight feature values of respective backlight partitions of a backlight module, according to first pixel data of respective pixels in an image to be displayed.

The image to be displayed is obtained from an image acquisition device or obtained by calling image resources in a memory. The first pixel data is, for example, sub-pixel values of respective sub-pixels (R, G, and B) in the pixels.

The backlight module is divided into a plurality of backlight partitions in advance, where each backlight partition corresponds to at least one light source. Each backlight partition corresponds to a plurality of pixels.

Illustratively, the embodiment of the present disclosure is applied to a 14.96-inch vehicle-mounted display screen, where a resolution of the screen is 2000×1200, the backlight module is divided into 48×24 backlight partitions in advance, and each backlight partition includes 50×50 pixels.

At step S12, determining backlight driving values of light sources in the respective backlight partitions, according to the first backlight feature values of the respective backlight partitions.

The backlight driving values of the light sources in the respective backlight partitions serves to drive the light sources in the respective backlight partitions to emit backlight corresponding to the image to be displayed.

Illustratively, the backlight driving values of the light sources in the respective backlight partitions may be smoothed, through the first backlight feature values of the respective backlight partitions corresponding to the image to be displayed, and in combination with screen characteristics of the display module, so as to reduce backlight difference between adjacent backlight partitions.

At step S13, determining second backlight feature values of the respective backlight partitions, according to a backlight diffusion factor group set in advance and the first backlight feature values of the respective backlight partitions.

The backlight diffusion factor group includes N×N backlight diffusion factors, where N is a positive integer.

It should be noted that, since the first backlight feature values of different backlight partitions are different, the determined backlight driving values of different backlight partitions are often different, so that backlight light emitted by adjacent backlight partitions may affect each other in a process of projecting and diffusing to a panel in a backlight cavity, and the actual backlight distribution of each backlight partition is not consistent with the backlight driving value corresponding to the backlight partition. If the influence of light diffusion is not considered and a pixel compensation is directly performed according to the determined first backlight feature value, not only does it fail to accurately reproduce image information, but also obvious block effect may be generated. Meanwhile, crosstalk occurs in light diffusion, so that the brightness of bright areas is reduced while the brightness of dark areas is increased, thereby affecting the display effect.

Figures 2, 3:
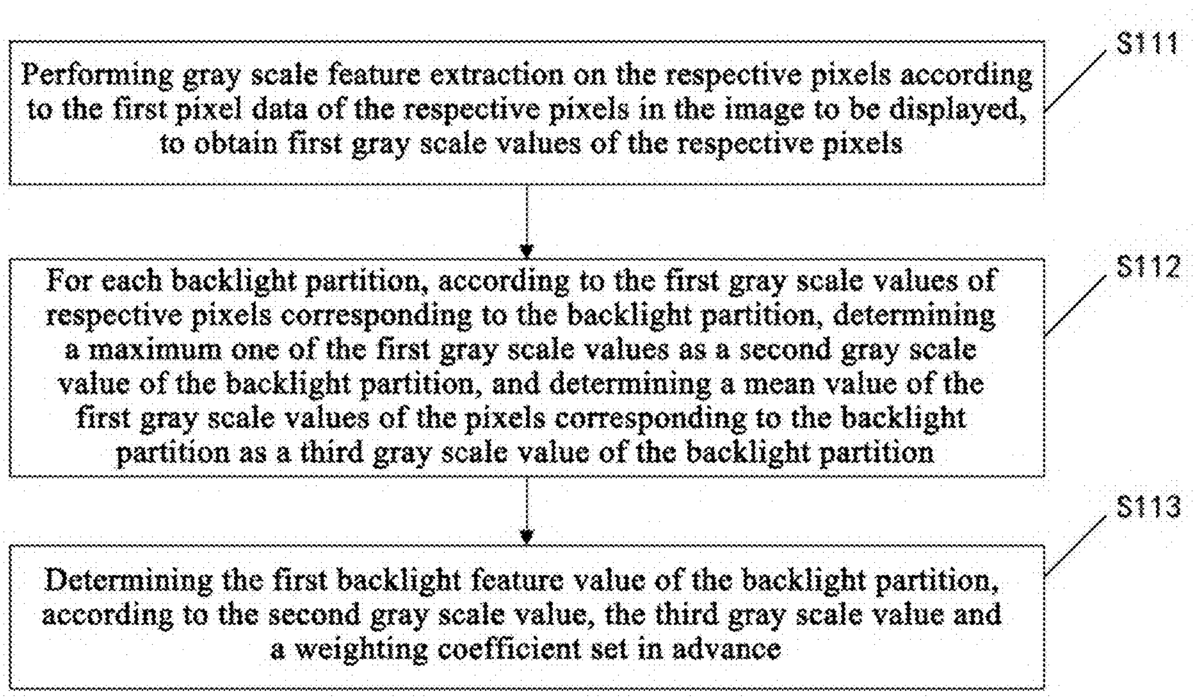
FIG. 2 is a schematic diagram illustrating a convolution diffusion model according to an embodiment of the present disclosure.
FIG. 3 is a schematic flowchart illustrating a process of determining a first backlight feature value of a backlight partition according to an embodiment of the present disclosure.

The backlight diffusion factor group may be a diffusion model which is established in advance by simulating the projection and diffusion process of the backlight light in the backlight cavity. Illustratively, a 9×9 convolution diffusion model may be established by actually testing the projection and diffusion of the backlight light in the backlight cavity, which model can simulate the backlight diffusion phenomenon more accurately. The 9×9 convolution diffusion model includes 81 backlight diffusion factors. FIG. 2 is a schematic diagram illustrating the convolution diffusion model according to an embodiment of the present disclosure. As shown in FIG. 2, a cumulative sum of the first backlight feature values of 81 backlight partitions multiplied by the backlight diffusion factors corresponding to the backlight partitions, respectively, is the second backlight feature value of each backlight partition. Here, the influence of light diffusion in the backlight partition can be eliminated through the backlight diffusion factor group, thereby improving the display effect.

Illustratively, the above display control method of the present disclosure may be deployed on a low-end chip, such as a Field Programmable Gate Array (FPGA). The 81 backlight diffusion factors are actual measurement values and may be pre-stored in a Read-Only Memory (ROM) inside the FPGA.

The backlight feature value (including the first backlight feature value and the second backlight feature value) in the present disclosure may also be understood as a brightness value of the backlight.

At step S14, compensating the first pixel data of respective pixels in the image to be displayed according to the second backlight feature values of the respective backlight partitions, to obtain compensated second pixel data for displaying.

Target compensation factors of the pixels may be determined based on the second backlight feature values of the respective backlight partitions; and the first pixel data of the pixels is compensated through the target compensation factors, to obtain the second pixel data of the pixels.

In the foregoing steps S11 to S14 of the embodiment of the present disclosure, the conventional display algorithm is improved based on the screen characteristics and the chip resource characteristics, and the backlight driving values of the light sources in the respective backlight partitions are smoothed, through the first backlight feature values of the respective backlight partitions corresponding to the image to be displayed, and in combination with the screen characteristics of the display module, so that the backlight difference between adjacent backlight partitions is reduced. Meanwhile, the influence of light diffusion in the backlight partition is eliminated according to the backlight diffusion factor group set in advance. On this basis, the first pixel data of respective pixels in the image to be displayed is compensated according to the second backlight feature values of the respective backlight partitions, the contrast of the image to be displayed can be improved, the power consumption can be reduced, and the image display details can be enhanced, and therefore the display effect is improved. Meanwhile, the above display control method of the present disclosure can be deployed on a low-end chip, such as a Field Programmable Gate Array (FPGA), so that the cost of a display product is reduced.

The display control method according to the embodiment of the present disclosure is described in detail with specific implementations below.

FIG. 3 is a schematic flowchart illustrating a process of determining a first backlight feature value of a backlight partition according to an embodiment of the present disclosure. In some implementations, as shown in FIG. 3, the step S11 of determining the first backlight feature values of the respective backlight partitions of the backlight module specifically includes the following steps S111 to S113.

At step S111, performing gray scale feature extraction on the respective pixels according to the first pixel data of the respective pixels in the image to be displayed, to obtain first gray scale values of the respective pixels.

The first pixel data of each pixel includes sub-pixel values of respective sub-pixels (R, G, and B) in the pixel, denoted as R(u,v), G(u,v), B(u,v).

Illustratively, for each pixel, a maximum sub-pixel value of the sub-pixel values of the sub-pixels may be taken as the first gray scale value of the pixel, which is shown in the following formula (2):

$$\text{gray}_{max}(u, v) = \max(R(u, v), G(u, v), B(u, v)), \quad \text{formula (2)}$$

where $\text{gray}_{max}$ (u,v) represents the first gray scale value of a pixel (u,v); max( ) represents taking the maximum value; R(u,v) represents the sub-pixel value of the sub-pixel R of the pixel (u,v); G(u,v) represents the sub-pixel value of the sub-pixel G of the pixel (u,v); and B(u,v) represents the sub-pixel value of the sub-pixel R of the pixel (u,v).

At step S112, for each backlight partition, according to the first gray scale values of respective pixels corresponding to the backlight partition, determining a maximum first gray scale value of the first gray scale values as a second gray scale value of the backlight partition, and determining a mean value of the first gray scale values of the pixels corresponding to the backlight partition as a third gray scale value of the backlight partition.

Illustratively, for each backlight partition, the first backlight feature value may be extracted by a maximum method and/or an average method.

Illustratively, the second gray scale value may be determined by a maximum method for each of the backlight partitions. Specifically, a maximum one of the first gray scale values of the pixels corresponding to the backlight partition may be taken as the second gray scale value of the backlight partition, which is shown in the following formula (3):

$$BL_{max} = \max(\text{gray}_{max}), \quad \text{formula (3)}$$

where $BL_{max}$ represents the second gray scale value of a backlight partition; max ( ) represents taking the maximum value; and $\text{gray}_{max}$ represents the first gray scale value of each pixel in the backlight partition.

Illustratively, the second gray scale value may be determined by an average method for each of the backlight partitions. Specifically, a mean value of the first gray scale values of the pixels corresponding to the backlight partition may be taken as the third gray scale value of the backlight partition, which is shown in the following formula (4):

$$BL_{ave} = \frac{\sum_{u=1}^{M}\sum_{v=1}^{m}\text{gray}_{max}(u, v)}{M \times m}, \quad \text{formula (4)}$$

where $BL_{ave}$ represents the third gray scale value of a backlight partition;

$$\sum_{u=1}^{M}\sum_{v=1}^{m}\text{gray}_{max}(u, v)$$

represents a cumulative sum of the first gray scale values of respective pixels in the backlight partition; and M and m represent the numbers of rows and columns of the pixels in the backlight partition, respectively, where taking a 14.96-inch vehicle-mounted display screen as an example, M=m=50.

At step S113, determining the first backlight feature value of the backlight partition, according to the second gray scale value, the third gray scale value and a weighting coefficient set in advance.

A value of the weighting coefficient set in advance ranges from 0 to 1.

The second gray scale value and the third gray scale value may be weighted according to the weighting coefficient, to obtain the first backlight feature value of the backlight partition.

Illustratively, for each backlight partition, the first backlight feature value thereof may be determined according to the following formula (5):

$$BL = P \times BL_{ave} + (1 - P) \times BL_{max}, \quad \text{formula (5)}$$

where BL represents the first backlight feature value of a backlight partition; P represents the weighting coefficient; $BL_{max}$ represents the second gray scale value of the backlight partition; and $BL_{ave}$ represents the third gray scale value of the backlight partition.

In a case where P=0, $BL=BL_{max}$, that is, the first backlight feature value is determined by the maximum method.

In a case where P=1, $BL=BL_{ave}$, that is, the first backlight feature value is determined by the average method.

Although the maximum method can greatly retain image details, the brightness of the image in a dark field area cannot be effectively controlled, the contrast is not improved sufficiently, and the power consumption is reduced limitedly. The average method can reduce the backlight to a great extent and reduce the power consumption, but for an area with high contrast, a backlight reduction degree exceeds a degree that the pixel compensation can reach, so that the image cannot be properly restored, and the correct display effect is difficult to generate. In view of above, the embodiment of the present disclosure adopts the maximum method and the average method to extract the first backlight feature value, which not only retains the advantages of the maximum method and the average method to a certain extent, but also makes up for the disadvantages of the two methods to a certain extent. Illustratively, a value of the weighting coefficient ranges from 0.5 to 0.9. For example, P is 0.85, so that the vehicle-mounted display screen has an extremely small halo effect.

Figure 4:
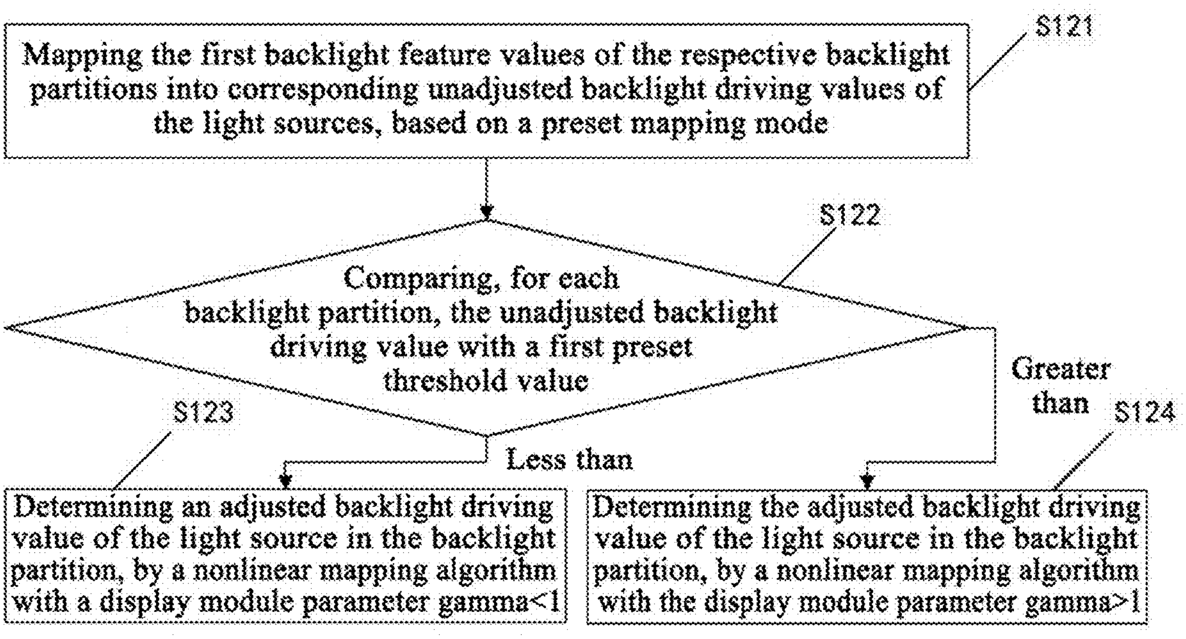
FIG. 4 is a schematic flowchart illustrating a process of determining an adjusted backlight driving value of a light source in a backlight partition according to an embodiment of the present disclosure.

FIG. 4 is a schematic flowchart illustrating a process of determining an adjusted backlight driving value of a light source in a backlight partition according to an embodiment of the present disclosure. In some implementations, as shown in FIG. 4, for the adjusted backlight driving value of the light source in the backlight partition, the step S12 specifically includes the following steps S121 to S124.

At step S121, mapping the first backlight feature values of the respective backlight partitions into corresponding unadjusted backlight driving values of the light sources, based on a preset mapping mode.

After the first backlight feature values of the backlight partitions are obtained, the first backlight feature values of the backlight partitions may be mapped to corresponding unadjusted backlight driving values of the light sources, based on a preset mapping mode. For example, the backlight driving value corresponding to the first backlight feature value is queried through lookup, based on a mapping Look-Up Table, where different first backlight feature values and backlight driving values corresponding to the first backlight feature values are stored in the mapping Look-Up Table in advance. For another example, the first backlight feature value may be mapped to a corresponding unadjusted backlight driving value of the light source, based on a mapping algorithm designed in advance. In the subsequent process, the backlight driving values obtained after the processing in step S121 may be input to a driving component (e.g., a driving chip) of a backlight assembly, to drive the LED lamps in the respective backlight partitions of the backlight panel to emit backlight corresponding to the target image. Thus, the processing of the backlight is completed.

Figure 5:
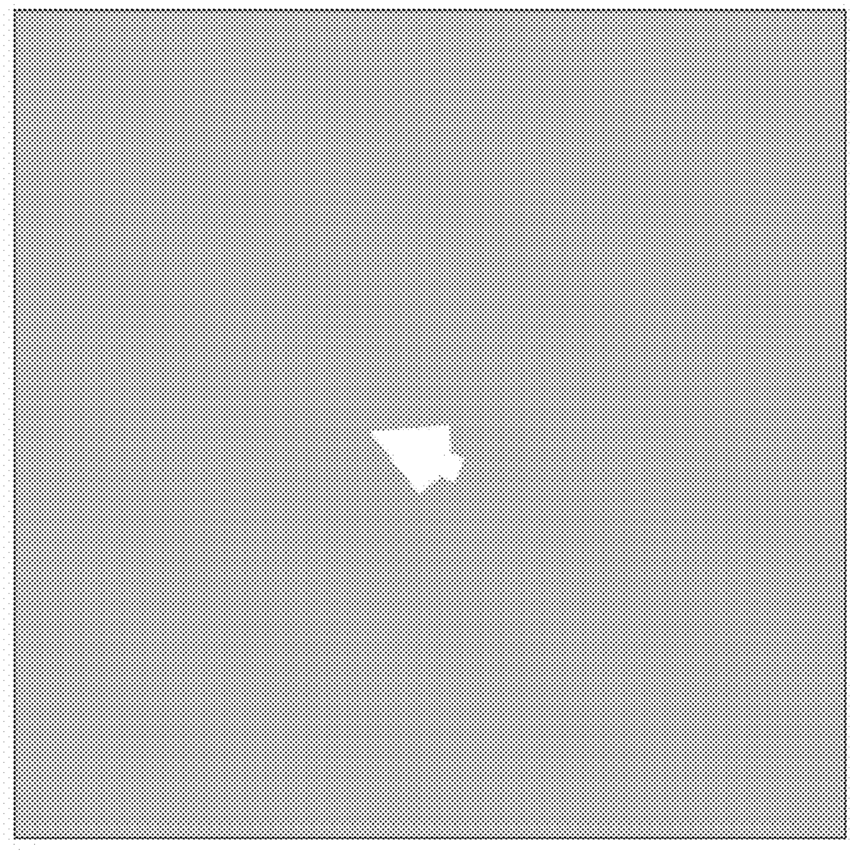
FIG. 5 is a schematic diagram illustrating an image to be displayed according to an embodiment of the present disclosure.

FIG. 5 is a schematic diagram illustrating an image to be displayed according to an embodiment of the present disclosure. As shown in FIG. 5, an unadjusted backlight driving value of the light source of a backlight partition is obtained through gray scale feature statistics. However, the backlight driving values of adjacent backlight partitions may be greatly different, thereby causing block effect to occur. A processing such as mean filtering or maximum filtering will undoubtedly increase the brightness of the backlight partition or the backlight partition that is driven to be lit up, so that the halo becomes large and the display effect is affected.

At step S122, comparing, for each backlight partition, the unadjusted backlight driving value with a first preset threshold value.

Step S123 is executed, in a case where the unadjusted backlight driving value is less than the first preset threshold; and step 124 is executed, in case where the unadjusted backlight driving value is greater than or equal to the first preset threshold.

Figures 6, 7:
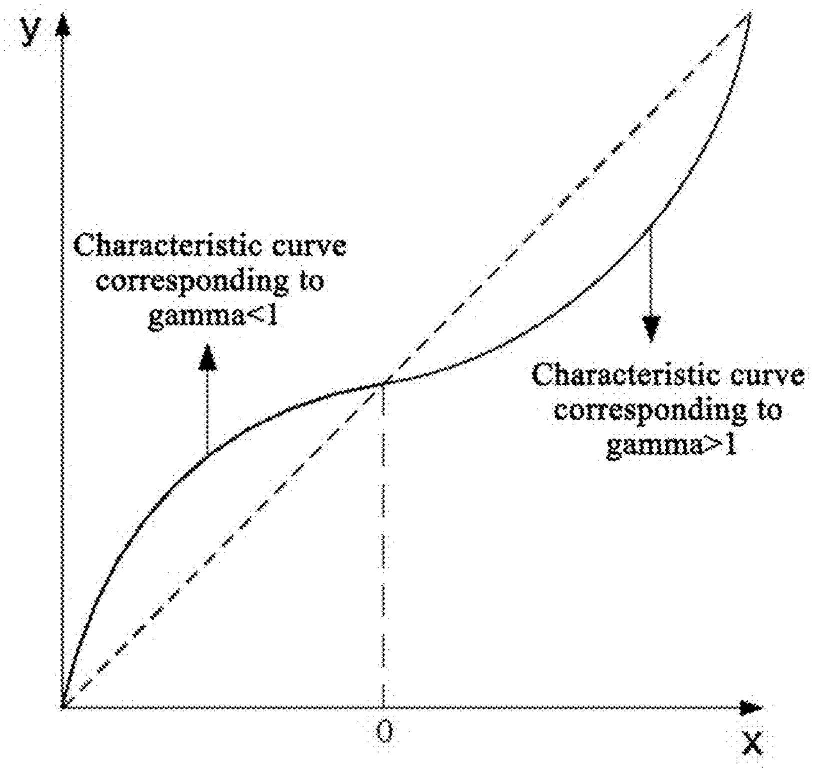
FIG. 6 is a schematic diagram illustrating a gamma curve according to an embodiment of the present disclosure.
FIG. 7 is a schematic diagram illustrating a backlight partition and first adjacent partitions thereof according to an embodiment of the present disclosure.

The first preset threshold may be a reference backlight driving value determined empirically, such as a backlight driving value indicated by a point O in FIG. 6.

At step S123, determining an adjusted backlight driving value of the light source in the backlight partition, by a nonlinear mapping algorithm with a display module parameter gamma<1.

FIG. 6 is a schematic diagram illustrating a gamma curve according to an embodiment of the present disclosure. As shown in FIG. 6, an abscissa x represents an unadjusted backlight driving value, an ordinate y represents an adjusted backlight driving value, and O represents the reference backlight driving value. The the display module parameter gamma can reflect the brightness of a color under different gray scales.

As shown in FIG. 6, taking a RGB color depth of 10 bit as an example, an interval range of the backlight driving value is [0, 1023]. Taking the value O within the interval range as a reference point, nonlinear transformation is performed on a portion of the unadjusted backlight driving values, which are less than O, by a curve function with the display module parameter gamma<1, to obtain the mapped adjusted backlight driving values.

At step S124, determining the adjusted backlight driving value of the light source in the backlight partition, by a nonlinear mapping algorithm with the display module parameter gamma>1.

As shown in FIG. 6, taking the RGB color depth of 10 bit as an example, the interval range of the backlight driving value is [0, 1023]. Taking the value O within the interval range as a reference value, nonlinear transformation is performed on a portion of the unadjusted backlight driving values, which are greater than or equal to O, by a curve function with the display module parameter gamma>1, to obtain the mapped adjusted backlight driving values.

In the above steps S121 to S124 of the present embodiment, by combining the first backlight feature values of the respective backlight partitions corresponding to the image to be displayed and the gamma parameter, reflecting a screen feature, of the display module, through the nonlinear transformation as shown in FIG. 6, the smaller backlight driving value may be increased by a little, and the larger backlight driving value may be decreased by a little, so that the backlight transition between the adjacent backlight partitions with significant difference is smoother, thereby reducing the halo, and improving the display effect.

In some implementations, in the step S13, the determining the second backlight feature values of the respective backlight partitions specifically includes: for each backlight partition, the first backlight feature value of the backlight partition and the first backlight feature values of first adjacent partitions of the backlight partition may be weighted with N×N backlight diffusion factors in the backlight diffusion factor group, to determine the second backlight feature value of the backlight partition.

The larger the value of N in the backlight diffusion factor group is, the higher the accuracy of the backlight diffusion simulation is, but the greater the calculation amount is; the smaller the value of N in the backlight diffusion factor group is, the lower the accuracy of the backlight diffusion simulation is, but the less the calculation amount is. N in the backlight diffusion factor group may be generally set according to the accuracy requirement and the calculation amount requirement of the light diffusion simulation. The embodiment of the present disclosure is described by taking N=9 as an example, that is, a backlight diffusion simulation is performed on 9×9 backlight partitions.

The first adjacent partitions include backlight partitions each having a partition distance from the backlight partition less than or equal to a first preset distance threshold. Illustratively, in a case of N=9, the first preset distance threshold may be 4, and the first adjacent partitions include 9×9-1 backlight partitions, which are centered on a backlight partition in $5^{th}$ row and $5^{th}$ column, and spaced by 4 backlight partitions from each of the upper, lower, left and right sides. Further illustratively, in a case of N=5, the first preset distance threshold may be 2, and the first adjacent partitions include 5×5-1 backlight partitions, which are centered on a backlight partition in $3^{rd}$ row and $3^{rd}$ column, and spaced by 2 backlight partitions from each of the upper, lower, left and right sides.

Figure 9:
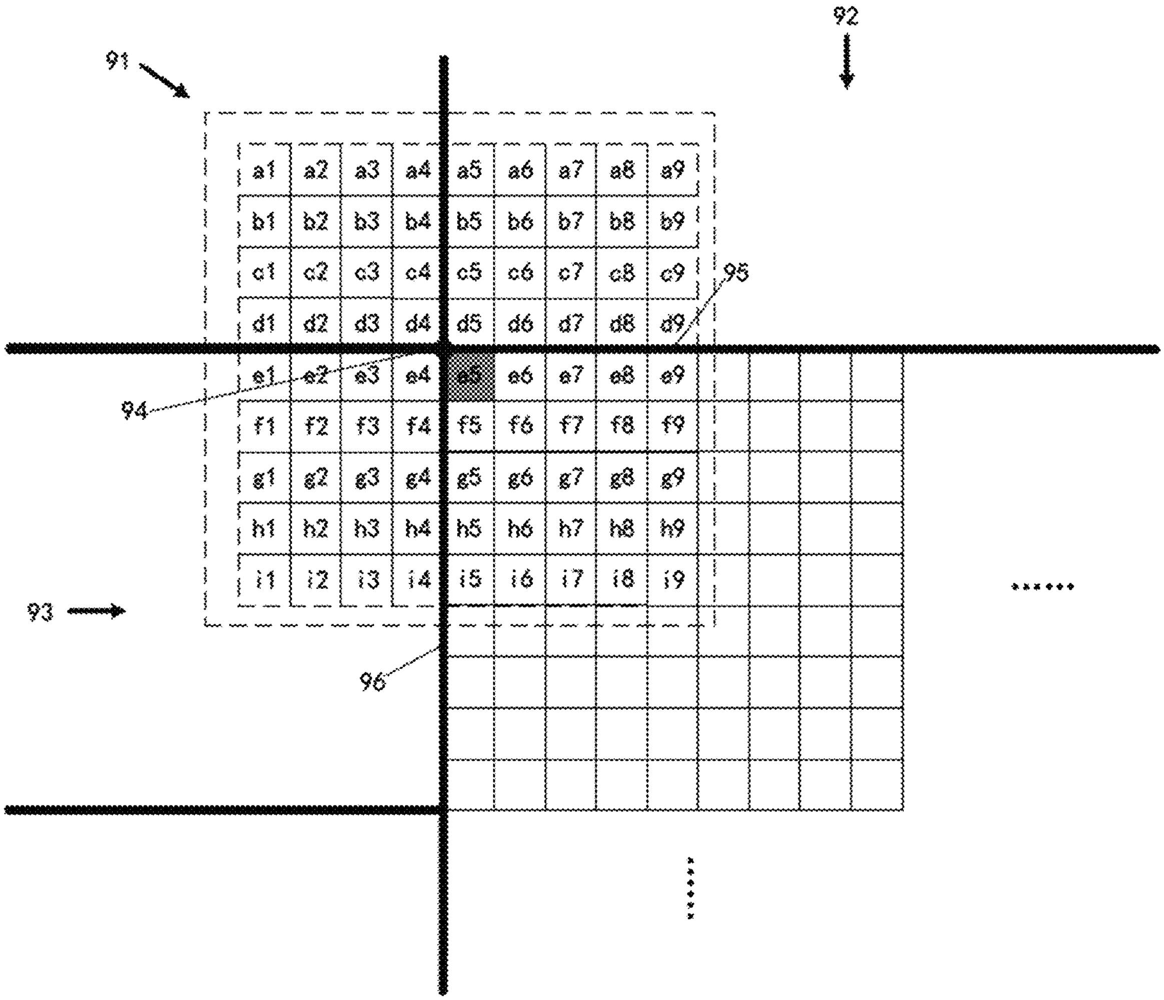
FIG. 9 is a schematic diagram illustrating first virtual mirroring areas according to an embodiment of the present disclosure.

FIG. 7 is a schematic diagram illustrating a backlight partition and first adjacent partitions thereof according to an embodiment of the present disclosure. As shown in FIGS. 2 and 7, 9×9 backlight diffusion factors p1 to p81 in a backlight diffusion factor group may be used to perform weighted summation on a first backlight feature value of the backlight partition e5 and first backlight feature values of first adjacent partitions (a1 to e4, and e6 to i9) of the backlight partition, to obtain a second backlight feature value of the backlight partition e5.

It should be noted that, where the selected backlight partition located at the center is located at an edge of the whole backlight module, the first adjacent partitions of the backlight partition located at the center further include virtual partitions each having a partition distance from the backlight partition less than or equal to the first preset distance threshold.

In one case, the first backlight feature value of each virtual partition is set in advance as a preset fixed value, where the preset fixed value may be set according to actual experience, for example, the preset fixed value may be set as 0. Alternatively, other data may be selected, which is not specifically limited in the embodiments of the present disclosure.

Figure 8:
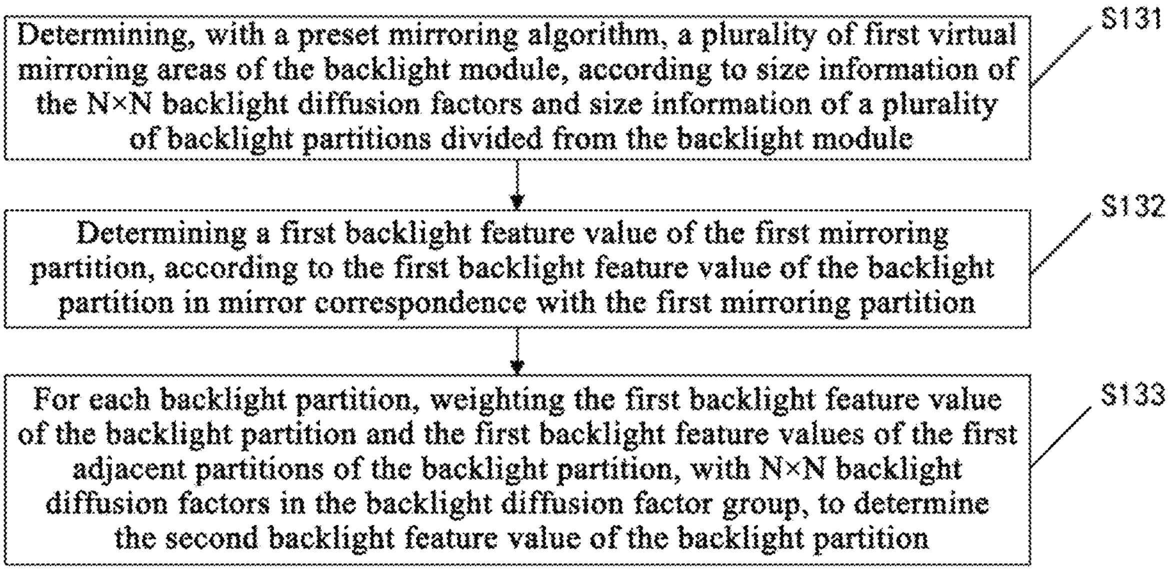
FIG. 8 is a schematic flowchart illustrating a process of determining a second backlight feature value of a backlight partition according to an embodiment of the present disclosure.

In another case, the respective virtual partitions are obtained by mirroring the backlight partitions, for example, as first mirroring partitions. The first backlight feature values of respective first mirroring partitions are first backlight feature values of the backlight partitions corresponding to the mirroring partitions, respectively. Taking this as an example, FIG. 8 is a schematic flowchart illustrating a process of determining a second backlight feature value of a backlight partition according to an embodiment of the present disclosure, and as shown in FIG. 8, it specifically includes the following steps S131 to S133.

At step S131, determining, with a preset mirroring algorithm, a plurality of first virtual mirroring areas of the backlight module, according to size information of the N×N backlight diffusion factors and size information of a plurality of backlight partitions divided from the backlight module.

Each first virtual mirroring area includes at least N rows and N columns of first mirroring partitions.

FIG. 9 is a schematic diagram illustrating first virtual mirroring areas according to an embodiment of the present disclosure. As shown in FIG. 9, a plurality of first virtual mirroring areas includes eight first virtual mirroring areas, where the first virtual mirroring area located at an upper left corner of the backlight module is the first virtual mirroring area 91, the first virtual mirroring area located above the backlight module is the first virtual mirroring area 92, and the first virtual mirroring area located at a left side of the backlight module is the first virtual mirroring area 93. In the embodiment of the present disclosure, it takes the first virtual mirroring areas 91, 92, and 93 as examples, to illustrate the setting of the first mirroring partitions in the respective virtual mirroring areas. As for the setting method of the first mirroring partitions in the first virtual mirroring areas in other directions, it will not be repeated in this regard.

The size information of the N×N backlight diffusion factors is N rows and N columns. The size information of the plurality of backlight partitions divided from the backlight module is W rows and H columns, where W represents the number of the backlight partitions divided in a row direction of the backlight module, and H represents the number of the backlight partitions divided in a column direction of the backlight module. Taking a 14.96-inch vehicle-mounted display screen as an example, the backlight module is divided into 48×24 backlight partitions in advance, where W=48, and H=24.

As shown in FIG. 9, the first virtual mirroring area 91 includes N rows and N columns of first mirroring partitions, where respective first mirroring partitions are obtained by mirroring the backlight partitions, taking a vertex 94 at the upper left corner as a reference; the first virtual mirroring area 92 includes N rows and W columns of first mirroring partitions, where respective first mirroring partitions are obtained by mirroring the backlight partitions, taking a boundary 95 as a reference; the first virtual mirroring area 93 includes H rows and N columns of first mirroring partitions, where respective first mirroring partitions are obtained by mirroring the backlight partitions, taking a boundary 96 as a reference.

At step S132, determining a first backlight feature value of the first mirroring partition, according to the first backlight feature value of the backlight partition in mirror correspondence with the first mirroring partition.

In one case, a corresponding memory may be separately created for storing the first backlight feature values of the first mirroring partitions, where the first backlight feature value of the first mirroring partition is the same as the first backlight feature value of the backlight partition in mirror correspondence with the first mirroring partition. Then, the first backlight feature value of the first mirroring partition may be directly acquired from the memory corresponding to the first mirroring partitions.

However, if there are more first mirroring partitions, then the additional storage space required for storing the first backlight feature values of the first mirroring partitions is larger. For a low-end chip, such as a GW2A-18 FPGA chip, Block RAM (BRAM) resources are very limited, so BRAM storage cannot be created separately for mirrored data. Therefore, in the case of being applied to an FPGA chip, after the respective first mirroring partitions are determined, calling addresses are configured for at least part of the first mirroring partitions, and the first backlight feature value of the first mirroring partition is read according to the calling address configured for the first mirroring partition.

Taking the backlight diffusion factor group including 9×9 backlight diffusion factors as an example, for the first virtual mirroring area 91, only the calling addresses of the first mirroring partitions in the $5^{th}$ to $9^{th}$ rows and the $5^{th}$ to $9^{th}$ columns need to be configured. For the first virtual mirroring area 92, only the calling addresses of the first mirroring partitions in the $5^{th}$ to $9^{th}$ rows need to be configured. For the first virtual mirroring area 93, only the calling addresses of the first mirroring partitions in the $5^{th}$ to $9^{th}$ columns need to be configured.

The 81 backlight diffusion factors are stored in ROM, and the calling addresses of the first mirroring partitions are stored in BRAM. It should be noted that the sum of the data amounts of the calling addresses is much less than the sum of the data amounts of the first backlight feature values of the first mirroring partitions.

Specifically, in the embodiment of the present disclosure, only one BRAM is required, and the data is stored in a form of rows and columns. For example, the storage starts from a calling address of the first backlight feature value of the backlight partition of the $5^{th}$ row and $5^{th}$ column. When performing 9×9 convolution calculation, weighted summation is performed on the first backlight feature values of the backlight partition e5 and the first adjacent partitions (a1 to e4, and e6 to i9) of the backlight partition. When reading the first adjacent partition of the $1^{st}$ row, the address read from BRAM is mirrored and shifted to the $9^{th}$ row, so that the first backlight feature value corresponding to the first adjacent partition of the $9^{th}$ row is read as the first backlight feature value of the first adjacent partition of the $1^{st}$ row. When reading the first adjacent partition of the $2^{nd}$ row, the address to be read from BRAM is mirrored and shifted to the $8^{th}$ row, so that the first backlight feature value corresponding to the first adjacent partition of the $8^{th}$ row is read as the first backlight feature value of the first adjacent partition of the $2^{nd}$ row. When reading the first adjacent partition of the $3^{rd}$ row, the address to be read from BRAM is mirrored and shifted to the $7^{th}$ row, so that the first backlight feature value corresponding to the first adjacent partition of the $7^{th}$ row is read as the first backlight feature value of the first adjacent partition of the $3^{rd}$ row. When reading the first adjacent partition of the $4^{th}$ row, the address to be read from BRAM is mirrored and shifted to the $6^{th}$ row, so that the first backlight feature value corresponding to the first adjacent partition of the $6^{th}$ row is read as the first backlight feature value of the first adjacent partition of the $4^{th}$ row. Similarly, when reading the first adjacent partition of the 1st column, the address to be read from BRAM is mirrored and shifted to the $9^{th}$ column, so that the first backlight feature value corresponding to the first adjacent partition of the $9^{th}$ column is read as the first backlight feature value of the first adjacent partition of the 1st column. When reading the first adjacent partition of the 2nd column, the address to be read from BRAM is mirrored and shifted to the 8th column, so that the first backlight feature value corresponding to first adjacent partition of the 8th column is read as the first backlight feature value of the first adjacent partition of the 2nd column. When reading the first adjacent partition of the 3rd column, the address to be read from BRAM is mirrored and shifted to the 7th column, so that the first backlight feature value corresponding to the first adjacent partition of the 7th column is read as the first backlight feature value of the first adjacent partition of the 3rd column. When reading the first adjacent partition of the 4th column, the address to be read from BRAM is mirrored and shifted to the 6th column, so that the first backlight feature value corresponding to the first adjacent partition of the 6th column is read as the first backlight feature value of the first adjacent partition of the 4th column. The method can realize the 9×9 convolution by only mirroring and shifting the row and column addresses to be read, without increasing the utilization amount of BRAM, so that the low resource utilization rate of a chip can be met.

At step S133, for each backlight partition, weighting the first backlight feature value of the backlight partition and the first backlight feature values of the first adjacent partitions of the backlight partition, with N×N backlight diffusion factors in the backlight diffusion factor group, to determine the second backlight feature value of the backlight partition.

Taking the backlight partition e5 as an example, a cumulative sum of the first backlight feature value of the backlight partition e5 and the first backlight feature values of the first adjacent partitions (including the backlight partitions and the first mirroring partitions surrounding the backlight partition e5) multiplied by the correspondingly obtained backlight diffusion factors, respectively, is the second backlight feature value of the backlight partition e5.

Here, the influence of light diffusion in the backlight partition can be eliminated through the backlight diffusion factor group, thereby improving the display effect.

Figures 10, 11A, 11B:
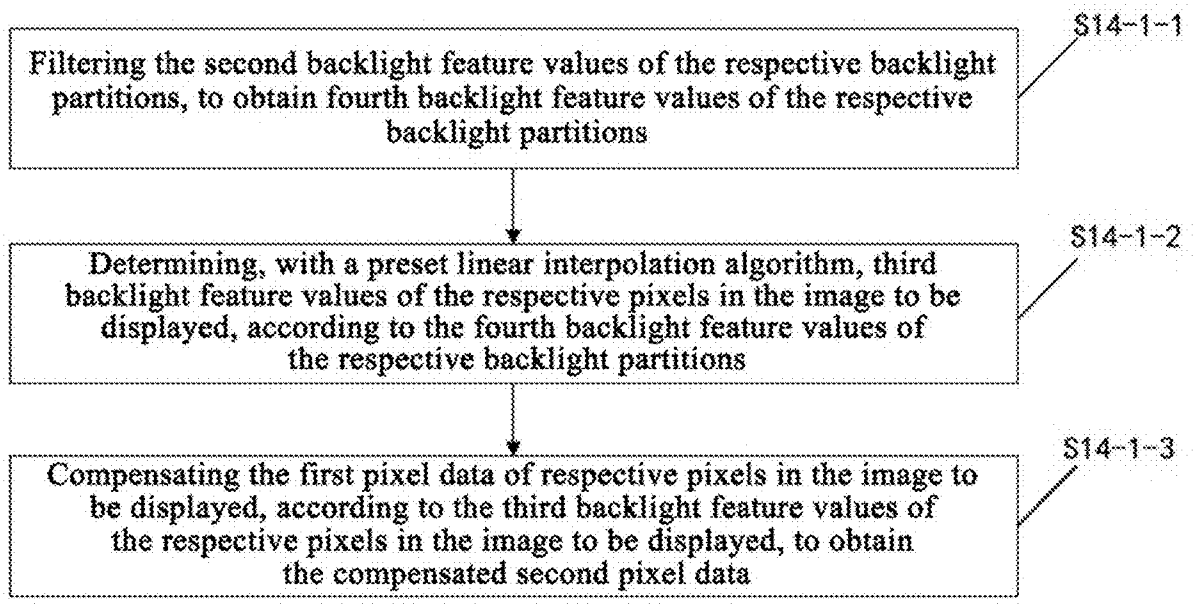
FIG. 10 is a schematic flowchart illustrating a process of pixel compensation according to an embodiment of the present disclosure.
FIG. 11*a* is a schematic diagram illustrating a backlight partition and second adjacent partitions thereof according to an embodiment of the present disclosure.
FIG. 11*b* is a schematic diagram illustrating a filter coefficient group according to an embodiment of the present disclosure.

FIG. 10 is a schematic flowchart illustrating a process of pixel compensation according to an embodiment of the present disclosure. In some implementations, as shown in FIG. 10, the process includes the following steps S14-1-1 to S14-1-3.

At step S14-1-1, filtering the second backlight feature values of the respective backlight partitions, to obtain fourth backlight feature values of the respective backlight partitions.

In some display scenes, the brightness difference between different backlight partitions is great, and even if the backlight simulation in the processes of steps S131 to S133 is performed on the backlight partitions, the brightness difference between different backlight partitions still is obvious, so that block effect occurs during compensation. In order to improve this defect, in the embodiment of the present disclosure, data processing is performed on the second backlight feature values of the respective backlight partitions through mean filtering, to obtain the fourth backlight feature values of the respective backlight partitions.

Specifically, for each backlight partition, the second backlight feature value of the backlight partition and the second backlight feature values of second adjacent partitions of the backlight partition may be filtered with a filter coefficient group determined in advance, to determine the fourth backlight feature value of the backlight partition.

The filter coefficient group includes n×n filter coefficients, where n is a positive integer. The larger the value of n in the filter coefficient group is, the higher the filtering accuracy is, but the larger the calculation amount is; the smaller the value of n in the filter coefficient group is, the lower the filtering accuracy is, but the calculation amount is smaller. Generally, n in the filter coefficient group may be set according to the filtering accuracy requirement and the calculation amount requirement. In the embodiments of the present disclosure, n=5 is taken as an example for description, that is, 5×5 filter coefficients are adopted in the mean filtering.

The second adjacent partitions include backlight partitions each having a partition distance from the backlight partition less than or equal to a second preset distance threshold. Illustratively, in a case of n=5, the second preset distance threshold may take 2, and the second adjacent partitions includes 5×5-1 backlight partitions, which are centered on the backlight partition of the 3rd row and 3rd column, and spaced by 2 backlight partitions from each of the top, bottom, left, and right sides.

FIG. 11*a* is a schematic diagram illustrating a backlight partition and second adjacent partitions thereof according to an embodiment of the present disclosure, and FIG. 11B is a schematic diagram illustrating a filter coefficient group according to an embodiment of the present disclosure. As shown in FIGS. 11*a* and 11*b*, 5×5 filter coefficients q1 to q25 in the filter coefficient group may be used to perform weighted summation on the second backlight feature value of the backlight partition B33 and second backlight feature values of the second adjacent partitions (B11 to B32, and B34 to B55) of the backlight partition, to obtain the fourth backlight feature value of the backlight partition B33.

It should be noted that, where the selected backlight partition located at the center is located at an edge of the whole backlight module, the second adjacent partitions of the backlight partition located at the center further include virtual partitions each having a partition distance from the backlight partition less than or equal to the second preset distance threshold.

In one case, the second backlight feature value of each virtual partition is set in advance as a preset fixed value, where the preset fixed value may be set according to actual experience, for example, the preset fixed value may be set to be 0. Alternatively, other data may be selected, which is not specifically limited in the embodiments of the present disclosure.

Figure 12:
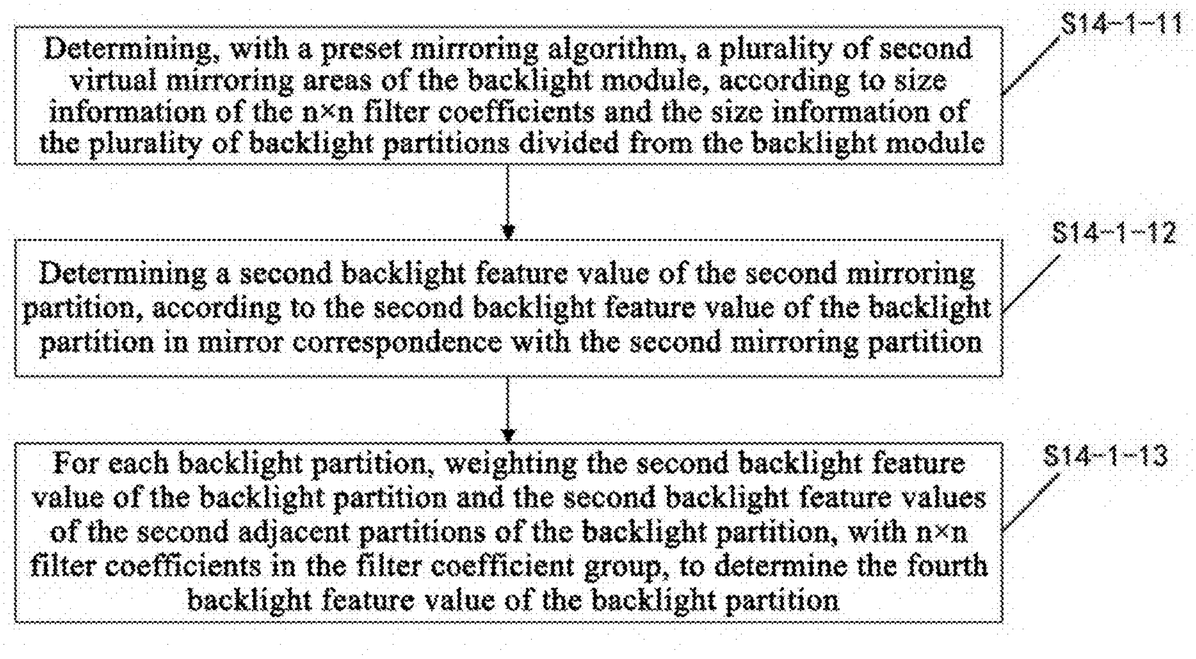
FIG. 12 is a schematic flowchart illustrating a process of determining a fourth backlight feature value of a backlight partition according to an embodiment of the present disclosure.

In another case, the respective virtual partitions are obtained by mirroring the backlight partitions, for example, as second mirroring partitions. The second backlight feature values of respective second mirroring partitions are the second backlight feature values of the backlight partitions in mirror correspondence with the mirroring partition. Taking this as an example, FIG. 12 is a schematic flowchart illustrating a process of determining a fourth backlight feature value of the backlight partition according to an embodiment of the present disclosure, and as shown in FIG. 12, it specifically includes steps S14-1-11 to S14-1-13.

At step S14-1-11, determining, with a preset mirroring algorithm, a plurality of second virtual mirroring areas of the backlight module, according to size information of the n×n filter coefficients and the size information of the plurality of backlight partitions divided from the backlight module.

Each second virtual mirroring area includes at least n rows and n columns of second mirroring partitions. The size information of n×n filter coefficients is n rows and n columns. The size information of the plurality of backlight partitions divided from the backlight module is W rows and H columns, where W represents the number of the backlight partitions divided in the row direction of the backlight module, and H represents the number of the backlight partitions divided in the column direction of the backlight module. Taking a 14.96-inch vehicle-mounted display screen as an example, the backlight module is divided into 48×24 backlight partitions in advance, where W=48, and H=24.

The principle of determining the second virtual mirroring area is the same as that of determining the first virtual mirroring area, and repeated descriptions are omitted.

At step S14-1-12, determining a second backlight feature value of the second mirroring partition, according to the second backlight feature value of the backlight partition in mirror correspondence with the second mirroring partition.

In one case, a corresponding memory may be separately created for storing the second backlight feature values of the second mirroring partitions, where the second backlight feature value of the second mirroring partition is the same as the second backlight feature value of the backlight partition in mirror correspondence with the second mirroring partition. Then, the second backlight feature value of the second mirroring partition may be directly acquired from the memory corresponding to the second mirroring partitions.

It should be noted that, if there are more second mirroring partitions, then the additional storage space required for storing the second backlight feature values of the second mirroring partitions is larger. For a low end chip, such as a GW2A-18 FPGA chip, Block RAM (BRAM) resources are very limited, so BRAM storage cannot be created separately for mirrored data. Therefore, in the case of being applied to an FPGA chip, after the respective second mirroring partitions are determined, calling addresses are configured for at least part of the second mirroring partitions, and the second backlight feature value of the second mirroring partition is read according to the calling address configured for the second mirroring partition.

The 25 filter coefficients are stored in ROM, and the calling addresses of the second mirroring partitions are stored in BRAM. It should be noted that the sum of the data amounts of the calling addresses is much less than the sum of the data amounts of the second backlight feature values of the second mirroring partitions.

Specifically, in the embodiment of the present disclosure, only one BRAM is required, and the data is stored in a form of rows and columns. For example, the storage starts from a calling address of the second backlight feature value of the backlight partition of the $3^{rd}$ row and $3^{rd}$ column. When performing 5×5 filtering calculation, weighted summation is performed on the second backlight feature value of the backlight partition B11 and the second backlight feature values of the second adjacent partitions (B11 to B32, and B34 to B55) of the backlight partition. When reading the second adjacent partition of the $1^{st}$ row, the address to be read from BRAM is mirrored and shifted to the $5^{th}$ row, so that the second backlight feature value corresponding to the second adjacent partition of the $5^{th}$ row is read as the second backlight feature value of the second adjacent partition of the $1^{st}$ row. When reading the second adjacent partition of the $2^{nd}$ row, the address to be read from BRAM is mirrored and shifted to the $4^{th}$ row, so that the second backlight feature value corresponding to the second adjacent partition of the $4^{th}$ row is read as the second backlight feature value of the second adjacent partition of the $2^{nd}$ row. Similarly, when reading the second adjacent partition of the $1^{st}$ column, the address to be read from BRAM is mirrored and shifted to the $5^{th}$ column, so that the second backlight feature value corresponding to the second adjacent partition of the $5^{th}$ column is read as the second backlight feature value of the second adjacent partition of the $1^{st}$ column. When reading the second adjacent partition of the $2^{nd}$ column, the address to be read from BRAM is mirrored and shifted to the $4^{th}$ column, so that the second backlight feature value corresponding to the second adjacent partition of the $4^{th}$ column is read as the second backlight feature value of the second adjacent partition of the $2^{nd}$ column. The method can realize the 5×5 filtering by only mirroring and shifting the row and column addresses to be read, without increasing the utilization amount of BRAM, so that the low resource utilization rate of a chip can be met.

At step S14-1-13, for each backlight partition, weighting the second backlight feature value of the backlight partition and the second backlight feature values of the second adjacent partitions of the backlight partition, with n×n filter coefficients in the filter coefficient group, to determine the fourth backlight feature value of the backlight partition.

Taking the backlight partition B11 as an example, a cumulative sum of the second backlight feature value of the backlight partition B11 and the second backlight feature values of the second adjacent partitions (including the backlight partitions and the second mirroring partitions surrounding the backlight partition B11) multiplied by the correspondingly obtained filter coefficients, respectively, is the fourth backlight feature value of the backlight partition B11.

Here, in the above steps S14-1-11 to S14-1-13, the block effect can be eliminated through the filtering processing with the filter coefficient group, thereby improving the display effect.

At step S14-1-2, determining, with a preset linear interpolation algorithm, third backlight feature values of the respective pixels in the image to be displayed, according to the fourth backlight feature values of the respective backlight partitions.

The preset linear interpolation algorithm may be, for example, a bilinear interpolation algorithm, a trilinear interpolation algorithm, a nearest neighbor interpolation algorithm, or the like, which is not specifically limited in the embodiments of the present disclosure.

Illustratively, the third backlight feature values of the respective pixels in the image to be displayed are determined, with the bilinear interpolation algorithm, according to the fourth backlight feature values of the respective backlight partitions.

Figure 13:
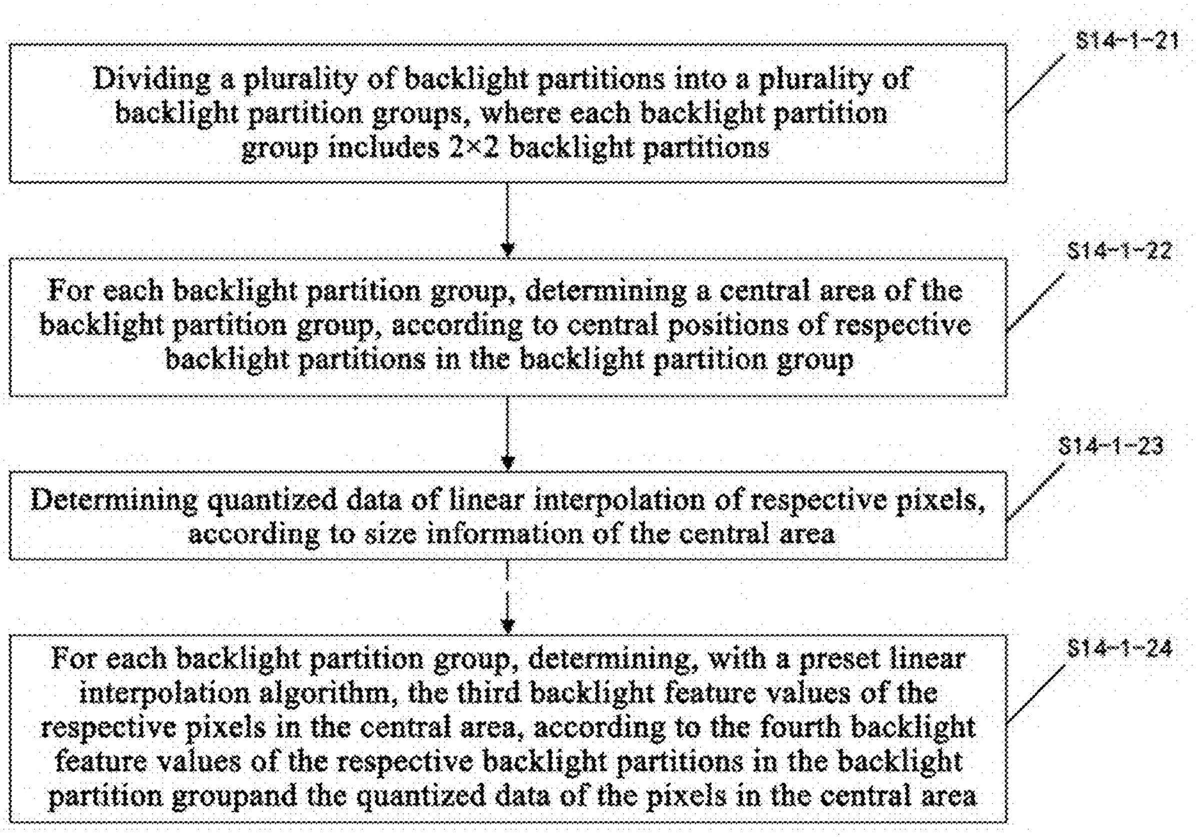
FIG. 13 is a schematic flowchart illustrating a process of determining third backlight feature values of respective pixels according to an embodiment of the present disclosure.

FIG. 13 is a schematic flowchart illustrating a process of determining third backlight feature values of respective pixels according to an embodiment of the present disclosure. As shown in FIG. 13, the process specifically includes the following steps S14-1-21 to S14-1-24.

At step S14-1-21, dividing a plurality of backlight partitions into a plurality of backlight partition groups, where each backlight partition group includes 2×2 backlight partitions.

At step S14-1-22, for each backlight partition group, determining a central area of the backlight partition group, according to central positions of respective backlight partitions in the backlight partition group.

The number of pixels in the central area is equal to that of the pixels in the backlight partition. Taking a 14.96-inch vehicle-mounted display screen as an example, the number of pixels in the central area is 50×50.

Figure 14A:
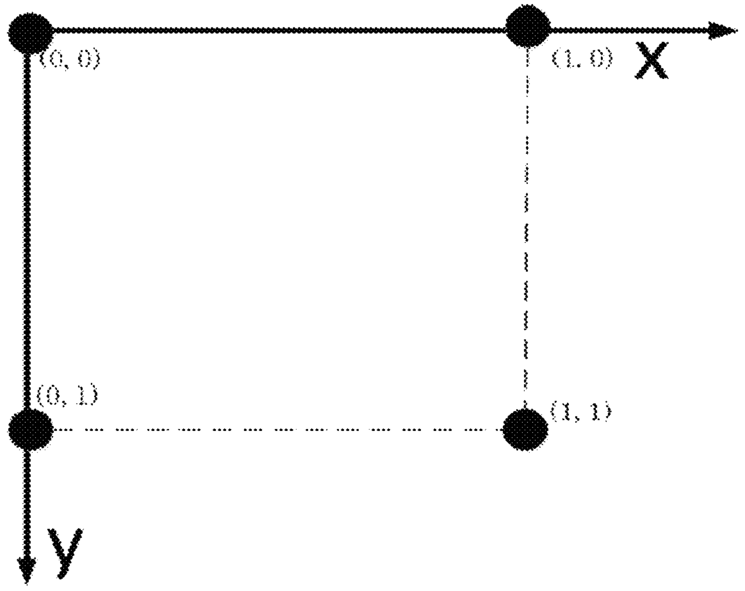
FIG. 14*a* is a schematic diagram illustrating bilinear interpolation according to an embodiment of the present disclosure.
Figure 14B:
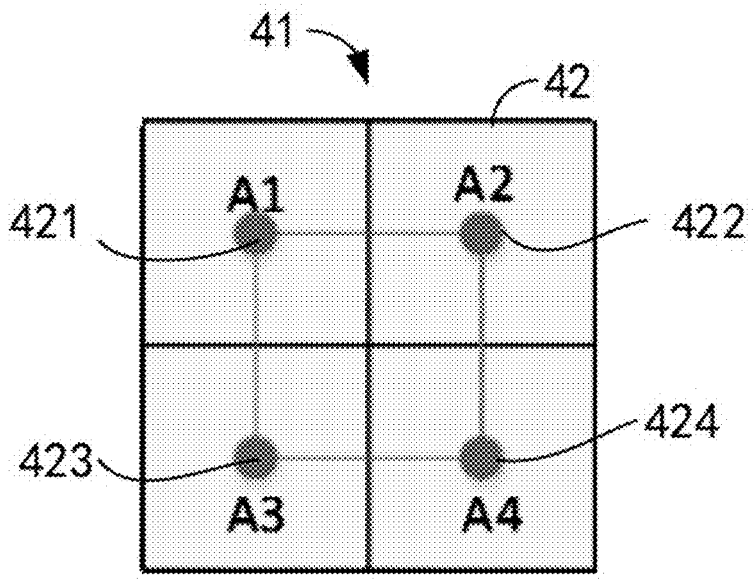
FIG. 14*b* is a diagram illustrating an interpolation model corresponding to FIG. 14*a;*

FIG. 14*a* is a schematic diagram illustrating a bilinear interpolation according to an embodiment of the present disclosure, and FIG. 14*b* is a schematic diagram illustrating an interpolation model corresponding to FIG. 14*a*. As shown in FIGS. 14*a* and 14*b*, reference sign 41 indicates a backlight partition group, reference sign 42 indicates a backlight partition, and reference signs 421, 422, 423, and 424 indicate central points of four backlight partitions 411, respectively. The coordinates of the center points are mapped in the bilinear interpolation algorithm into, for example, (0, 0), (0, 1), (1, 0), and (1, 1).

A calculation formula (6) of the third backlight feature value f(i,j) of any one pixel (i,j) in the central area 43 surrounded by the central points of the four backlight partitions is as follows:

$$f(i,j) = A1\times(1-x)\times(1-y) + A2\times x\times(1-x) + A3\times(1-x)\times y + A4\times x\times y, \quad \text{formula (6)}$$

where A1, A2, A3, A4 represent fourth backlight feature values of the four backlight partitions 411 of 421, 422, 423, and 424, respectively. A value of y is mapped to a value of i/W corresponding to the actual pixel (i,j), a value of x is mapped to a value of j/H corresponding to the actual pixel (i,j), where a value range of i is [0, W−1], and a value range of j is [0, H−1]. Thus, the W×H values obtained by the formula (6) are in one-to-one correspondence with the W×H pixels in the central area 43.

However, the values of i/W and j/H are all decimal numbers, and in GW2A-18 FPGA, a digital signal processor (i.e., DSP multiplier) does not support decimal calculation, so that quantization processing is further required for data such as x, y, (1-x), (1-y), and the like.

At step S14-1-23, determining quantized data of linear interpolation of respective pixels, according to size information of the central area.

The size information of the central area is the number of pixels in the central area, i.e., W×H pixels. Data "1" is quantized to 50, data x is quantized to 50x, and data y is quantized to 50y.

In GW2A-18 FPGA, the digital signal processor (i.e., DSP multiplier) supports calculations with a bit width such as 9×9, 18×18, 36×36, or the like, and the number of the bit widthes is 48 in total. The DSP with a 9×9 bit width does not support the data calculation before quantization, so the present embodiment firstly performs quantization processing on position data of respective pixels in the central area, which can ensure that the DSP with a 9×9 bit width can be utilized, thereby reducing the waste of DSP resources.

After using 9×9 DSP, a second multiplication operation may use a 18×18 DSP multiplier, avoiding waste of resources.

At step S14-1-24, for each backlight partition group, determining, with a preset linear interpolation algorithm, the third backlight feature values of the respective pixels in the central area, according to the fourth backlight feature values of the respective backlight partitions in the backlight partition group and the quantized data of the pixels in the central area.

Referring to formula (6), middle backlight feature value f(i,j)' of each pixel in the central area is determined as: f(i,j)'=A1×(50−50x)×(50−50y)+A2×50x×(50−50x)+A3×(50−50x)×50y+A4×50x×50y.

Then, for each pixel, the third backlight feature value of the pixel is f(i,j)=f(i,j)'/50.

The determination process of the third backlight feature values of respective pixels in other central areas is the same, and repeated description is omitted. In this step, the central areas of respective backlight partition groups form a plurality of backlight partitions of the backlight module. Therefore, the third backlight feature values of the pixels of respective backlight partitions can be obtained through determining the third backlight feature values of the pixels of the respective central areas.

At step S14-1-3, compensating the first pixel data of respective pixels in the image to be displayed, according to the third backlight feature values of the respective pixels in the image to be displayed, to obtain the compensated second pixel data.

Figure 15:
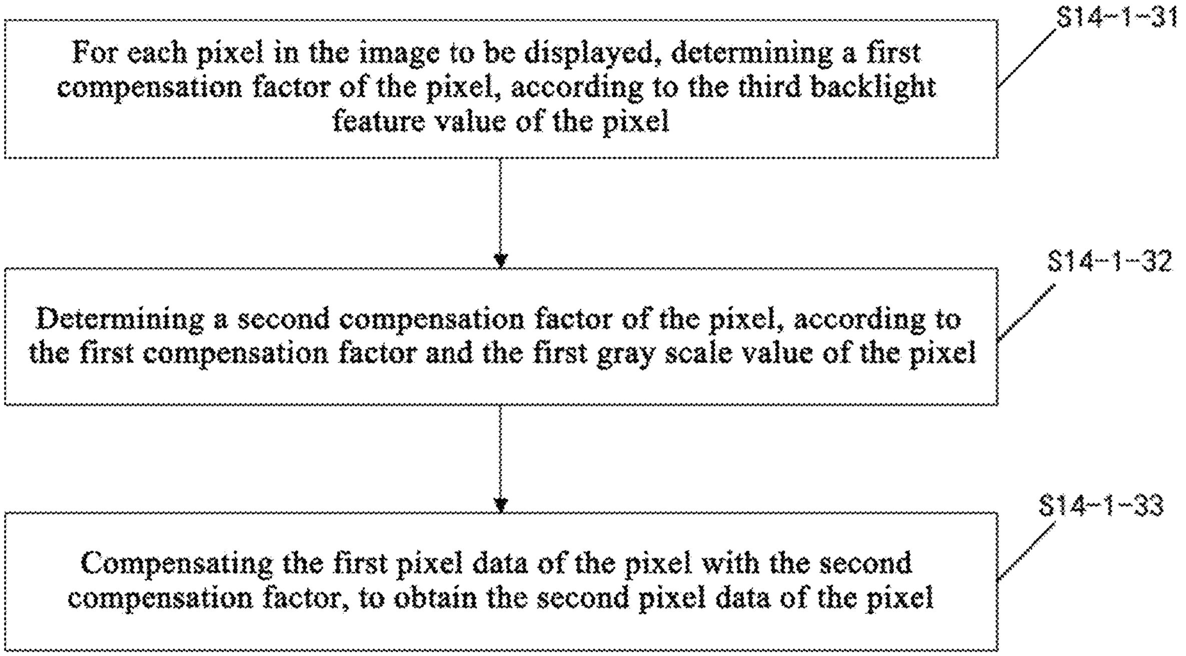
FIG. 15 is a schematic flowchart illustrating a process of compensating first pixel data of respective pixels in an image to be displayed to obtain compensated second pixel data according to an embodiment of the present disclosure.

FIG. 15 is a schematic flowchart illustrating a process of compensating first pixel data of respective pixels in an image to be displayed to obtain compensated second pixel data according to an embodiment of the present disclosure. As shown in FIG. 15, the process specifically includes the following steps S14-1-31 to S14-1-33.

At step S14-1-31, for each pixel in the image to be displayed, determining a first compensation factor of the pixel, according to the third backlight feature value of the pixel.

Taking a pixel (i,j) as an example, the process of determining the first compensation factor is shown in the following formula (7):

$$\text{factor}(i,j) = \left(\frac{BL_{base}}{BL_{pix}(i,j)}\right)^{\frac{1}{\gamma}}, \quad \text{formula (7)}$$

where factor(i,j) represents the first compensation factor of the pixel (i,j); $BL_{base}$ represents a constant in actual measurement, for example, $BL_{base}$ takes a preset maximum pixel gray scale value; $BL_{pix}$ (i,j) represents the third backlight feature value of the pixel (i,j); and gamma is a fixed value, for example, 2.2.

At step S14-1-32, determining a second compensation factor of the pixel, according to the first compensation factor and the first gray scale value of the pixel.

Taking the pixel (i,j) as an example, the process of determining the second compensation factor is shown in the following formula (8):

$$\text{factor}_{min}(i,j) = \min\left(\left(\frac{1023}{\text{gray}_{max}(i,j)}\right), \text{factor}_{(i,j)}\right), \quad \text{formula (8)}$$

where $\text{factor}_{min}$ (i,j) represents the second compensation factor of the pixel (i,j); $\text{gray}_{max}$ (i,j) represents the first gray scale value of the pixel (i,j); and factor (i,j) represents the first compensation factor of the pixel (i,j).

At step S14-1-33, compensating the first pixel data of the pixel with the second compensation factor, to obtain the second pixel data of the pixel.

Taking the pixel (i,j) as an example, the process of determining the second pixel data of the pixel is shown in the following formula (9):

$$R'(i,j) = R(i,j)\times\text{factor}_{min}(i,j) \quad \text{formula (9)}$$
$$G'(i,j) = G(i,j)\times\text{factor}_{min}(i,j)$$
$$B'(i,j) = B(i,j)\times\text{factor}_{min}(i,j).$$

The second pixel data includes sub-pixel values of respective sub-pixels (R, G, and B) in the pixel, that is, R'(i,j), G'(i,j), and B'(i,j).

Figure 16:
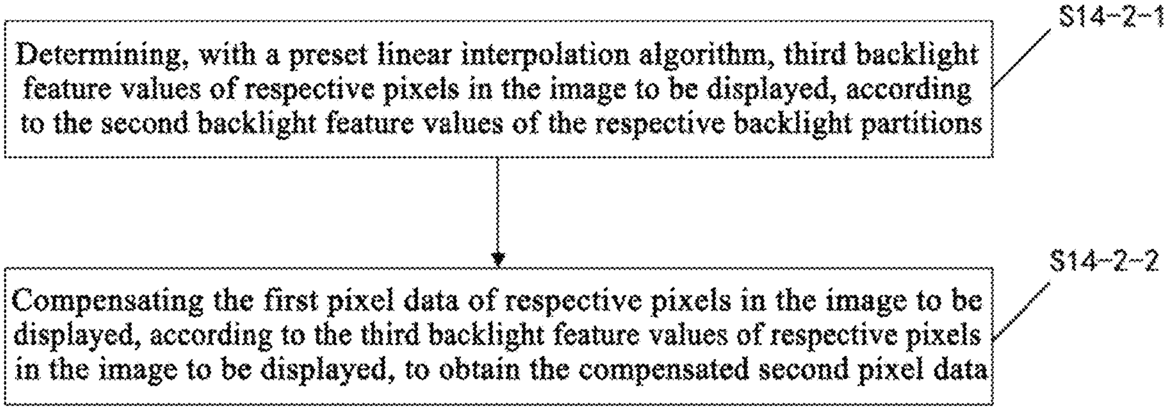
FIG. 16 is a schematic diagram illustrating another process of pixel compensation according to an embodiment of the present disclosure.

FIG. 16 is a schematic flowchart illustrating another process of pixel compensation according to an embodiment of the present disclosure. In some implementations, as shown in FIG. 16, the process includes the following steps S14-2-1 to S14-2-2.

At step S14-2-1, determining, with a preset linear interpolation algorithm, third backlight feature values of respective pixels in the image to be displayed, according to the second backlight feature values of the respective backlight partitions.

The process of determining the third backlight feature values of the respective pixels in this step, may refer to the detailed implementation process of determining the third backlight feature values of respective pixels in step S14-1-2, and repeated description is omitted.

At step S14-2-2, compensating the first pixel data of respective pixels in the image to be displayed, according to the third backlight feature values of respective pixels in the image to be displayed, to obtain the compensated second pixel data.

The process of obtaining the compensated second pixel data in this step may refer to the detailed implementation process of obtaining the compensated second pixel data in step S14-1-3, and repeated description is omitted.

In some implementations, in the case that the display condition of the target image is satisfied, the backlight driving values of the plurality of backlight partitions and the second pixel data of the respective pixels are simultaneously input into the driving component and the display module, respectively.

That is to say, if the display condition of the image to be displayed is met, the backlight driving values of the plurality of backlight partitions and the second pixel data of the respective pixels are respectively input into the driving component in the backlight module and the display module at the same time, so that the driving component drives the light sources of the plurality of backlight partitions to emit backlight corresponding to the image to be displayed, and meanwhile the display module displays the image to be displayed.

In the embodiment of the present disclosure, the backlight data (the backlight driving values of respective backlight areas) and the pixel data (the second pixel data of the respective pixels) corresponding to the same image to be displayed are simultaneously transmitted to the backlight module and the display module, respectively, so as to ensure the matching between the backlight data and the pixel data.

Figure 17:
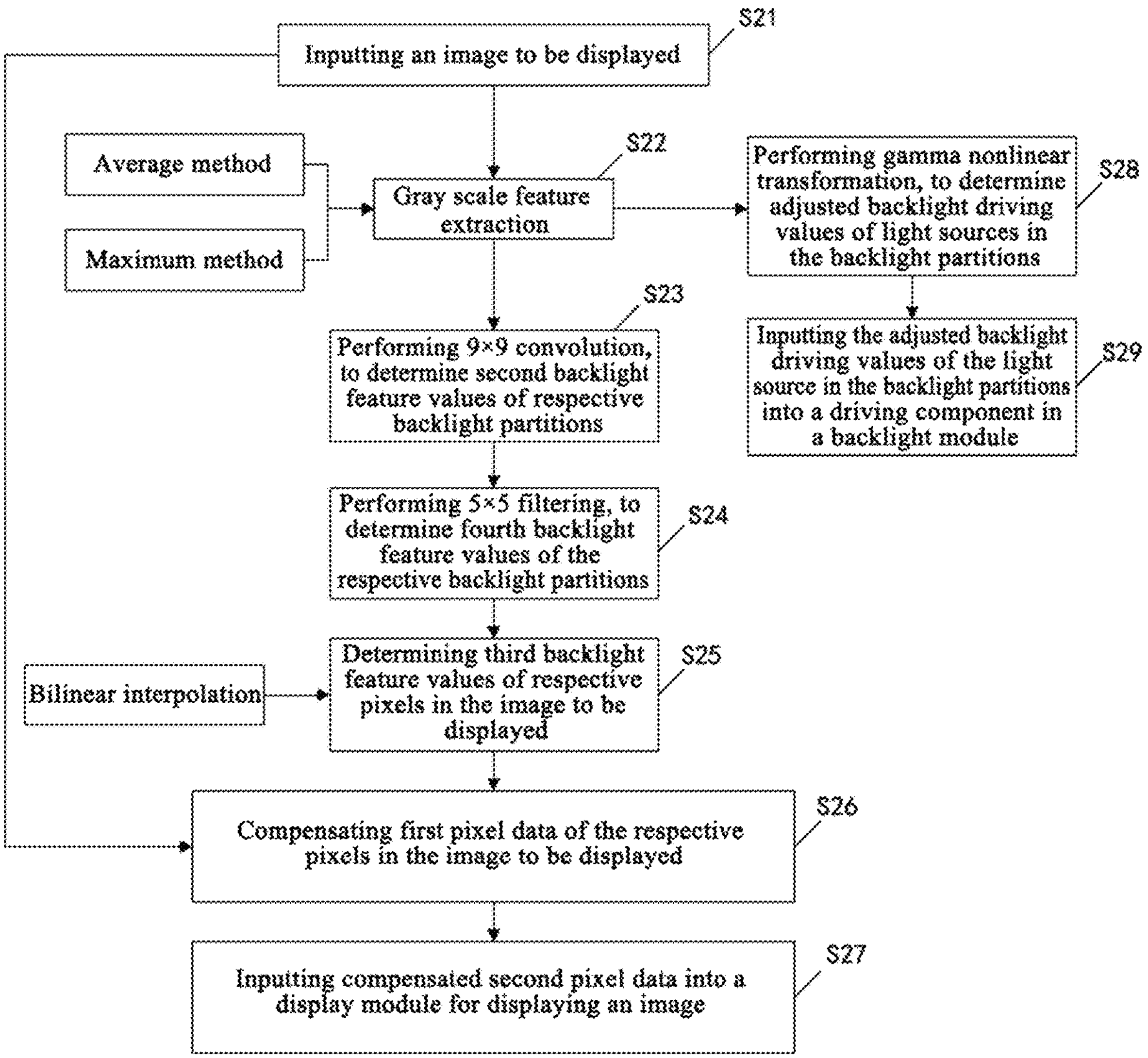
FIG. 17 is a specific flowchart illustrating a display control method according to an embodiment of the present disclosure.

To facilitate understanding of various embodiments of the present disclosure, an implementation flow of a display control method is described below with a complete example. FIG. 17 is a specific flowchart illustrating a display control method according to an embodiment of the present disclosure. As shown in FIG. 17, the display control method includes the following steps S21 to S29.

At step S21, inputting an image to be displayed;

At step S22, performing gray scale feature extraction by weighting of an average method and a maximum method, and synchronously executing the steps S23 and S28;

At step S23, performing 9×9 convolution, to determine the second backlight feature values of respective backlight partitions;

At step S24, performing 5×5 filtering, to determine the fourth backlight feature values of the respective backlight partitions;

At step S25, determining third backlight feature values of respective pixels in the image to be displayed, with a bilinear interpolation;

At step S26, compensating the first pixel data of the respective pixels in the image to be displayed to obtain compensated second pixel data;

S27, inputting the compensated second pixel data into a display module, for displaying an image.

S28, performing a gamma nonlinear transformation, to determine the adjusted backlight driving values of the light sources in the backlight partitions; and S29, inputting the adjusted backlight driving values of the light sources in the backlight partitions into a driving component in a backlight module, to drive, by the driving component, the light sources of the plurality of backlight partitions to emit backlight corresponding to the image to be displayed.

The display control method according to the present disclosure improves the traditional algorithm based on the screen characteristics and the chip resource characteristics, so that the contrast can be improved, the power consumption can be reduced, and the image display details can be enhanced, and in addition, the display control method can be deployed to a low-end chip, thereby reducing the product cost.

The above is a full description of the display control method according to the present disclosure.

It will be understood by one of ordinary skill in the art that in the above method of the present embodiment, the writing order of the respective steps does not imply a strict execution order and does not impose any limitations on the implementation. The specific execution order of the respective steps should be determined by their function and possibly inherent logic.

In a second aspect, an embodiment of the present disclosure further provides a display control apparatus corresponding to the display control method. Since a principle of solving the problem of the apparatus in the embodiment of the present disclosure is similar to that of the display control method in the embodiment of the present disclosure, the implementation of the apparatus may refer to the implementation of the method, and repeated description is omitted.

Figure 18:
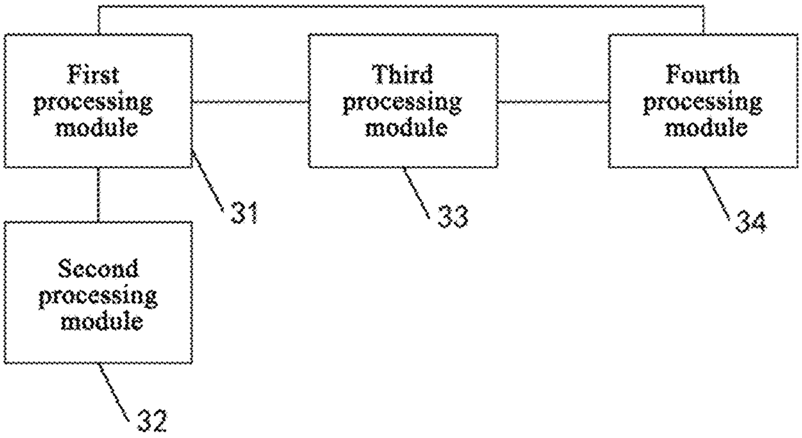
FIG. 18 is a schematic diagram illustrating a display control apparatus according to an embodiment of the present disclosure.

FIG. 18 is a schematic diagram illustrating a display control apparatus according to an embodiment of the present disclosure. As shown in FIG. 18, it includes a first processing module 31, a second processing module 32, a third processing module 33, and a fourth processing module 34. The first processing module 31 is configured to determine first backlight feature values of respective backlight partitions of the backlight module according to first pixel data of respective pixels in an image to be displayed; the second processing module 32 is configured to determine backlight driving values of light sources in the respective backlight partitions according to the first backlight feature values of the respective backlight partitions; the third processing module 33 is configured to determine second backlight feature values of the respective backlight partitions according to a backlight diffusion factor group set in advance and the first backlight feature values of the respective backlight partitions, where the backlight diffusion factor group includes N×N backlight diffusion factors, and N is a positive integer; and the fourth processing module 34 is configured to compensate the first pixel data of respective pixels in the image to be displayed, according to the second backlight feature values of the respective backlight partitions, to obtain compensated second pixel data for displaying.

The embodiments of the present disclosure essentially improve the traditional display algorithm based on screen characteristics and chip resource characteristics, and smooth the backlight driving values of the light sources in the respective backlight partitions, through the first backlight feature values of the respective backlight partitions corresponding to the image to be displayed, and in combination with the screen characteristics of the display module, thereby reducing the backlight difference between the adjacent backlight partitions. Meanwhile, the influence of light diffusion in the backlight partition is eliminated according to a backlight diffusion factor group set in advance, and on this basis, first pixel data of respective pixels in the image to be displayed is compensated according to second backlight feature values of the respective backlight partitions, so that the contrast of the image to be displayed can be improved, the power consumption can be reduced, and the image display details can be enhanced, thereby improving the display effect. Meanwhile, the display control method can be deployed on a low-end chip, such as an FPGA, thereby reducing the cost of display product.

In a third aspect, an embodiment of the present disclosure further provides a display device corresponding to the display control method. Since a principle of solving the problem of the display device in the embodiment of the present disclosure is similar to that of the display control method in the embodiment of the present disclosure, implementation of the display device may refer to the implementation of the method, and repeated description is omitted.

Figure 19:
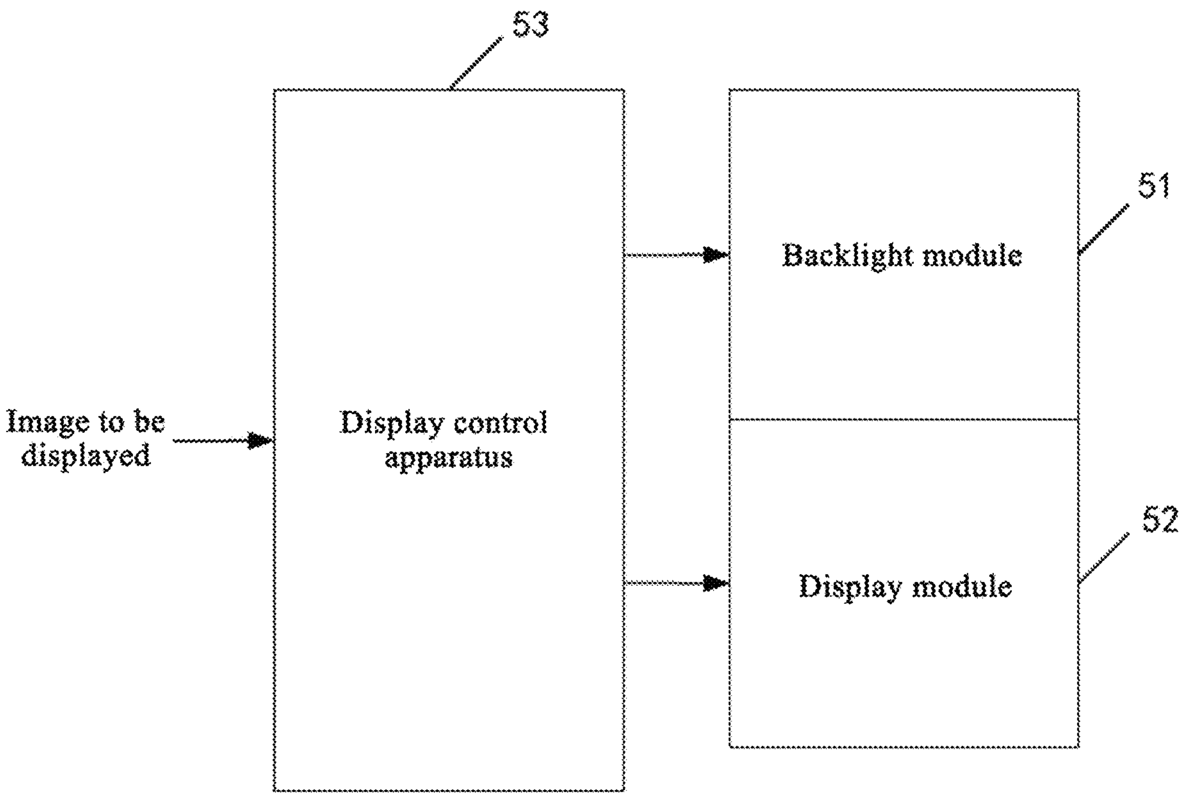
FIG. 19 is a schematic diagram illustrating a display device according to an embodiment of the present disclosure.

FIG. 19 is a schematic diagram illustrating a display device according to an embodiment of the present disclosure. As shown in FIG. 19, the display device includes a backlight module 51, a display module 52, and a display control apparatus 53. The display control apparatus 53 is connected to both of the backlight module 51 and the display module 52, and the display control apparatus 53 adopts the display control apparatus in the second aspect; the backlight module 51 includes a driving component and a plurality of backlight partitions, the driving component is configured to drive the plurality of backlight partitions to emit backlight according to backlight driving values of the plurality of backlight partitions; and the display module 52 serves to display according to the input second pixel data.

In some implementations, the display control apparatus 53 may be a field programmable gate array FPGA, or may be another type of logic device, which is not limited in the present disclosure.

In some implementations, the display module 52 includes a 14.96-inch display screen.

Figure 20:
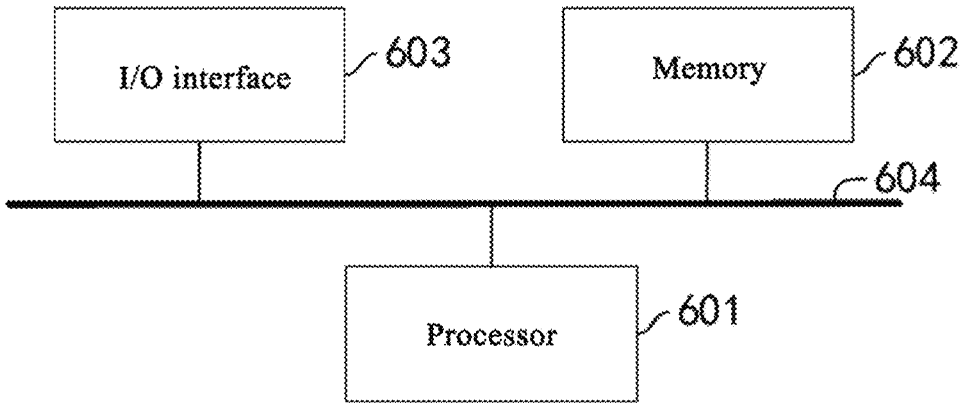
FIG. 20 is a schematic diagram illustrating an electronic device according to an embodiment of the present disclosure.

In a fourth aspect, an embodiment of the present disclosure further provides an electronic device. FIG. 20 is a schematic diagram illustrating the electronic device according to an embodiment of the present disclosure. As shown in FIG. 20, the electronic device includes one or more processors 601, a memory 602, and one or more I/O interfaces 603. The memory 602 stores thereon one or more programs which, when executed by the one or more processors, cause the one or more processors to implement the display control method in any one of the above embodiments. The one or more I/O interfaces 603 are coupled between the one or more processors and the memory, and are configured to enable information interaction between the one or more processors and the memory.

The processor 601 is a device with data processing capability, which includes but is not limited to a central pocessing unit (CPU), or the like. The memory 602 is a device having data storage capabilities including, but not limited to, random access memory (RAM, more specifically SDRAM, DDR, etc.), read only memory (ROM), electrically erasable programmable read only memory (EEPROM), flash memory (FLASH). The I/O interface (read/write interface) 603 coupled between the processor 601 and the memory 602 may enable information interaction between the processor 601 and the memory 602, which may include, but is not limited to, a data bus (Bus), or the like.

In some implementations, the processor 601, the memory 602, and the I/O interface 603 are connected to each other through a bus 604, and in turn to other components of the computing device.

In some implementations, the one or more processors 601 include a Field Programmable Gate Array (FPGA).

In a fifth aspect, an embodiment of the present disclosure further provides a non-transitory computer readable storage medium. The non-transitory computer readable storage medium stores thereon a computer program which, when being executed by a processor, implements steps in any one display control method in the above embodiments.

In particular, according to an embodiment of the present disclosure, the process described above with reference to the flowchart may be implemented as a computer software program. For example, an embodiment of the present disclosure includes a computer program product including a computer program carried on a machine readable medium, where the computer program includes program codes for performing the method illustrated by the flowchart. In such an embodiment, the computer program may be downloaded and installed from a network via a communication part, and/or installed from a removable medium. The above functions defined in the system of the present disclosure are performed when the computer program is performed by a Central Processing Unit (CPU).

It should be noted that the non-transitory computer readable medium shown in the present disclosure may be a computer readable signal medium, a computer readable storage medium, or any combination of the two. A computer readable storage medium may be, for example, but not limited to, an electronic, magnetic, optical, electromagnetic, infrared, or semiconductor system, apparatus, or device, or any combination thereof. More specific examples of the computer readable storage medium may include, but are not limited to, an electrical connection having one or more wires, a portable computer diskette, a hard disk, a Random Access Memory (RAM), a Read-Only Memory (ROM), an Erasable Programmable Read-Only Memory (EPROM or flash memory), an optical fiber, a portable Compact Disc Read-Only Memory (CD-ROM), an optical storage device, a magnetic storage device, or any suitable combination thereof. In the present disclosure, a computer readable storage medium may be any tangible medium that contains or stores a program, which can be used by or in connection with an instruction execution system, apparatus, or device. In contrast, in the present disclosure, a computer readable signal medium may include a propagated data signal with computer readable program code carried therein, in a baseband or as a part of a carrier wave. Such a propagated data signal may take any of a variety of forms, including, but not limited to, electro-magnetic signal, optical signal, or any suitable combination thereof. A computer readable signal medium may also be any non-transitory computer readable storage medium other than a computer readable storage medium, which may transmit, propagate, or convey a program for use by or in connection with an instruction execution system, apparatus, or device. The program codes on the non-transitory computer readable storage medium may be conveyed by any appropriate medium, including but not limited to wireless, a wire, fiber optic cable, RF, etc., or any suitable combination thereof.

The flowchart and block diagram in the figures illustrate an architecture, functionality, and operation possibly implemented by the apparatus, the method and the computer program product according to various embodiments of the present disclosure. In this regard, each block in the flowchart or block diagram may represent a module, a program segment, or a part of codes, which includes one or more executable instructions for implementing a specified logical function. It should also be noted that, in some alternative implementations, the function noted in the block may occur in a different order from that noted in the figures. For example, two blocks connected to each other may, in fact, denote to be executed substantially concurrently, or the blocks may sometimes be executed in a reverse order, depending upon the functionality involved. It should also be noted that each block in the block diagram and/or the flowchart, and combinations of blocks in the block diagram and/or the flowchart, may be implemented by a special purpose hardware-based system that performs the specified function or act, or by a combination of a special purpose hardware and computer instructions.

It will be understood that the above embodiments are merely exemplary embodiments adopted to illustrate the principles of the present disclosure, and the present disclosure is not limited thereto. It will be apparent to one of ordinary skill in the art that various modifications and improvements can be made without departing from the spirit and scope of the present disclosure, and such modifications and improvements are also considered to be within the scope of the present disclosure.

What is claimed is:

1. A display control method, comprising:

determining first backlight feature values of respective backlight partitions of a backlight module, according to first pixel data of respective pixels in an image to be displayed;

determining backlight driving values of light sources in the respective backlight partitions, according to the first backlight feature values of the respective backlight partitions;

determining second backlight feature values of the respective backlight partitions, according to a backlight diffusion factor group set in advance and the first backlight feature values of the respective backlight partitions, wherein the backlight diffusion factor group comprises N×N backlight diffusion factors, and N is a positive integer; and compensating the first pixel data of the respective pixels in the image to be displayed, according to the second backlight feature values of the respective backlight partitions, to obtain compensated second pixel data for displaying, wherein the determining the first backlight feature values of the respective backlight partitions of the backlight module according to the first pixel data of respective pixels in the image to be displayed, comprises:

performing gray scale feature extraction on the respective pixels according to the first pixel data of the respective pixels in the image to be displayed, to obtain first gray scale values of the respective pixels;

for each backlight partition, according to the first gray scale values of respective pixels corresponding to the backlight partition, determining a maximum one of the first gray scale values as a second gray scale value of the backlight partition, and determining a mean value of the first gray scale values of the respective pixels corresponding to the backlight partition as a third gray scale value of the backlight partition; and determining the first backlight feature value of the backlight partition according to the second gray scale value, the third gray scale value and a preset weighting coefficient, wherein a value of the preset weighting coefficient is in a range from 0 to 1.

2. The display control method according to claim 1, wherein the value of the weighting coefficient is in a range from 0.5 to 0.9.

3. The display control method according to claim 1, wherein the determining the backlight driving values of the light sources in the respective backlight partitions according to the first backlight feature values of the respective backlight partitions, comprises:

mapping the first backlight feature values of the respective backlight partitions into corresponding unadjusted backlight driving values, based on a preset mapping mode; and for each backlight partition, under a condition that the unadjusted backlight driving value is less than a first preset threshold value, determining an adjusted backlight driving value of the light source in the backlight partition, by a nonlinear mapping algorithm with a display module parameter gamma<1; and under a condition that the unadjusted backlight driving value is greater than or equal to the first preset threshold value, determining an adjusted backlight driving value of the light source in the backlight partition, by a nonlinear mapping algorithm with the display module parameter gamma>1.

4. The display control method according to claim 1, wherein the determining the second backlight feature values of the respective backlight partitions according to the backlight diffusion factor group set in advance and the first backlight feature values of the respective backlight partitions, comprises:

for each backlight partition, weighting the first backlight feature value of the backlight partition and the first backlight feature values of first adjacent partitions of the backlight partition with N×N backlight diffusion factors in the backlight diffusion factor group, to determine the second backlight feature value of the backlight partition, wherein the first adjacent partitions comprise backlight partitions each having a partition distance from the backlight partition less than or equal to a first preset distance threshold.

5. The display control method according to claim 4, wherein the first adjacent partitions further comprise first mirroring partition having a partition distance from the backlight partition less than or equal to the first preset distance threshold; and prior to the weighting the first backlight feature value of the backlight partition and the first backlight feature values of the first adjacent partitions of the backlight partition with the N×N backlight diffusion factors in the backlight diffusion factor group, to determine the second backlight feature value of the backlight partition, the display control method further comprises:

determining, with a preset mirroring algorithm, a plurality of first virtual mirroring areas of the backlight module, according to size information of the N×N backlight diffusion factors and size information of the backlight partitions divided from the backlight module, wherein each of the plurality of first virtual mirroring areas comprises at least N rows and N columns of first mirroring partitions; and determining a first backlight feature value of the first mirroring partition, according to the first backlight feature value of the backlight partition in mirror correspondence with the first mirroring partition.

6. The display control method according to claim 5, wherein the determining the first backlight feature value of the first mirroring partition according to the first backlight feature value of the backlight partition in mirror correspondence with the first mirroring partition, comprises:

configuring a calling address for each of at least part of the first mirroring partitions, and reading the first backlight feature value of the first mirroring partition, according to the calling address configured for the first mirroring partition.

7. The display control method according to claim 1, wherein the compensating the first pixel data of respective pixels in the image to be displayed according to the second backlight feature values of the respective backlight partitions, to obtain the compensated second pixel data, comprises:

determining, with a preset linear interpolation algorithm, third backlight feature values of the respective pixels in the image to be displayed, according to the second backlight feature values of the respective backlight partitions; and compensating the first pixel data of the respective pixels in the image to be displayed, according to the third backlight feature values of the respective pixels in the image to be displayed, to obtain the compensated second pixel data.

8. The display control method according to claim 1, wherein the compensating the first pixel data of respective pixels in the image to be displayed according to the second backlight feature values of the respective backlight partitions, to obtain the compensated second pixel data, comprises:

filtering the second backlight feature values of the respective backlight partitions, to obtain fourth backlight feature values of the respective backlight partitions;

determining, with a preset linear interpolation algorithm, third backlight feature values of the respective pixels in the image to be displayed, according to the fourth backlight feature values of the respective backlight partitions; and compensating the first pixel data of respective pixels in the image to be displayed, according to the third backlight feature values of respective pixels in the image to be displayed, to obtain the compensated second pixel data.

9. The display control method according to claim 8, wherein the filtering the second backlight feature values of the respective backlight partitions to obtain the fourth backlight feature values of the respective backlight partitions, comprises:

for each of the backlight partitions, filtering the second backlight feature value of the backlight partition and the second backlight feature values of second adjacent partitions of the backlight partition, with a filter coefficient group determined in advance, to determine the fourth backlight feature value of the backlight partition, wherein the second adjacent partitions comprise backlight partitions each having a partition distance from the backlight partition less than or equal to a second preset distance threshold.

10. The display control method according to claim 9, wherein the second adjacent partitions further comprise second mirroring partitions each having a partition distance from the backlight partition less than or equal to the second preset distance threshold, wherein the filter coefficient group comprises n×n filter coefficients, and n is a positive integer; and prior to the filtering the second backlight feature value of the backlight partition and the second backlight feature values of the second adjacent partitions of the backlight partition with the filter coefficient group determined in advance, to determine the fourth backlight feature value of the backlight partition, the display control method further comprises:

determining, with a preset mirroring algorithm, a plurality of second virtual mirroring areas of the backlight module, according to size information of the n×n filter coefficients and size information of the backlight partitions divided from the backlight module; and determining a second backlight feature value of the second mirroring partition, according to the second backlight feature value of the backlight partition in mirror correspondence with the second mirroring partition.

11. The display control method according to claim 10, wherein the determining the second backlight feature value of the second mirroring partition according to the second backlight feature value of the backlight partition in mirror correspondence with the second mirroring partition, comprises:

configuring a calling address for each of at least part of the second mirroring partitions, and reading the second backlight feature value of the second mirroring partition, according to the calling address configured for the second mirroring partition.

12. The display control method according to claim 8, wherein the determining, with preset linear interpolation algorithm, the third backlight feature values of the respective pixels in the image to be displayed, according to the fourth backlight feature values of the respective backlight partitions, comprises:

dividing the backlight partitions into a plurality of backlight partition groups, wherein each of the plurality of backlight partition groups comprises 2×2 backlight partitions;

for each of the plurality of backlight partition groups, determining a central area of the backlight partition group, according to central positions of respective backlight partitions in the backlight partition group, wherein the number of pixels in the central area is equal to the number of pixels in the backlight partition;

determining quantized data of linear interpolation of respective pixels, according to size information of the central area; and for each backlight partition group, determining, with a preset linear interpolation algorithm, the third backlight feature values of respective pixels in the central area, according to the fourth backlight feature values of the respective backlight partitions in the backlight partition group and the quantized data of the pixels in the central area, wherein the central areas of the respective backlight partition groups form the backlight partitions of the backlight module.

13. The display control method according to claim 8, wherein the compensating the first pixel data of the respective pixels in the image to be displayed, according to the third backlight feature values of the respective pixels in the image to be displayed, to obtain the compensated second pixel data, comprises:

for each pixel in the image to be displayed, determining a first compensation factor of the pixel, according to the third backlight feature value of the pixel;

determining a second compensation factor of the pixel, according to the first compensation factor and the first gray scale value of the pixel; and compensating the first pixel data of the pixel with the second compensation factor, to obtain the second pixel data of the pixel.

14. A display control apparatus, comprising a first processing module, a second processing module, a third processing module, and a fourth processing module;

wherein the first processing module is configured to determine first backlight feature values of respective backlight partitions of a backlight module, according to first pixel data of respective pixels in an image to be displayed;

the second processing module is configured to determine backlight driving values of light sources in the respective backlight partitions, according to the first backlight feature values of the respective backlight partitions;

the third processing module is configured to determine second backlight feature values of the respective backlight partitions, according to a backlight diffusion factor group set in advance and the first backlight feature values of the respective backlight partitions, wherein the backlight diffusion factor group comprises N×N backlight diffusion factors, and N is a positive integer; and the fourth processing module is configured to compensate the first pixel data of the respective pixels in the image to be displayed, according to the second backlight feature values of the respective backlight partitions, to obtain compensated second pixel data for displaying, wherein the first processing module is further configured to:

perform gray scale feature extraction on the respective pixels according to the first pixel data of the respective pixels in the image to be displayed, to obtain first gray scale values of the respective pixels;

for each backlight partition, according to the first gray scale values of respective pixels corresponding to the backlight partition, determine a maximum one of the first gray scale values as a second gray scale value of the backlight partition, and determine a mean value of the first gray scale values of the respective pixels corresponding to the backlight partition as a third gray scale value of the backlight partition; and determine the first backlight feature value of the backlight partition according to the second gray scale value, the third gray scale value and a preset weighting coefficient, wherein a value of the preset weighting coefficient is in a range from 0 to 1.

15. A display device, comprising a backlight module, a display module, and a display control apparatus, wherein the display control apparatus is connected to both of the backlight module and the display module, and the display control apparatus is the display control apparatus according to claim 14;

the backlight module comprises a driving component and a plurality of backlight partitions, wherein the driving component serves to drive the plurality of backlight partitions to emit backlight, according to backlight driving values of the plurality of backlight partitions; and the display module serves to display according to input second pixel data.

16. The display device according to claim 15, wherein the display module comprises a 14.96-inch display screen.

17. An electronic device, comprising:

one or more processors; and a memory for storing one or more programs, wherein when being executed by the one or more processors, the one or more programs cause the one or more processors to implement the display control method according to claim 1.

18. The electronic device according to claim 17, wherein the one or more processors comprise a Field Programmable Gate Array (FPGA).

19. A non-transitory computer readable storage medium storing thereon a computer program which, when being executed by a processor, performs steps of the display control method according to claim 1.

* * * * *